(12) United States Patent
Li et al.

(10) Patent No.: US 10,744,654 B2
(45) Date of Patent: Aug. 18, 2020

(54) GRIPPER CONTROL DEVICE, GRIPPER CONTROL METHOD, AND GRIPPER SIMULATION DEVICE

(71) Applicant: FANUC CORPORATION, Yamanashi (JP)

(72) Inventors: Weijia Li, Yamanashi (JP); Wenjie Chen, Yamanashi (JP); Hiroshi Nakagawa, Yamanashi (JP); Takafumi Kajiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 178 days.

(21) Appl. No.: 16/020,705

(22) Filed: Jun. 27, 2018

(65) Prior Publication Data
US 2019/0001508 A1  Jan. 3, 2019

(30) Foreign Application Priority Data
Jun. 30, 2017 (JP) .................... 2017-129480

(51) Int. Cl.
*B25J 15/10* (2006.01)
*G05B 13/04* (2006.01)
(Continued)

(52) U.S. Cl.
CPC ............ *B25J 15/10* (2013.01); *B25J 9/1612* (2013.01); *B25J 15/0009* (2013.01); *G05B 13/041* (2013.01); *G05B 2219/39515* (2013.01)

(58) Field of Classification Search
CPC .................... B25J 15/10; G05B 13/041
See application file for complete search history.

(56) References Cited

U.S. PATENT DOCUMENTS

| 4,598,942 A * | 7/1986 | Shum ............... B25J 15/103 |
| | | 294/106 |
| 9,321,176 B1 * | 4/2016 | Sun ................. B25J 9/1612 |

(Continued)

FOREIGN PATENT DOCUMENTS

| CN | 1528571 A | 9/2004 |
| CN | 1757490 A | 4/2006 |

(Continued)

OTHER PUBLICATIONS

Japanese Office Action dated Feb. 26, 2019, for Japanese Patent Application No. 2017-129480.
(Continued)

*Primary Examiner* — Kira Nguyen
(74) *Attorney, Agent, or Firm* — Karceski IP Law, PLLC

(57) ABSTRACT

A gripper control device includes a controller, the controller is configured to conduct: a grasp quality evaluation process to obtain a grasp quality contribution degree for each of a plurality of contact positions at which fingers that support the object are in contact with the object; a finger-to-be-moved determination process configured to determine, as a finger-to-be-moved, the finger corresponding to one of the contact positions at which the grasp quality contribution degree is low; and a finger movement control process configured to send a control command to a finger driving apparatus, wherein the grasp quality contribution degree for each of the multiple contact positions is defined using at least one of the following elements: relative positions of the plurality of contact positions related to the object; and friction coefficients between the object and the fingers at the plurality of contact positions.

25 Claims, 16 Drawing Sheets

(51) Int. Cl.
B25J 9/16 (2006.01)
B25J 15/00 (2006.01)

(56) References Cited

U.S. PATENT DOCUMENTS

| | | |
|---|---|---|
| 2006/0145494 A1 | 7/2006 | Nihei et al. |
| 2008/0114491 A1 | 5/2008 | Takahashi |
| 2010/0235145 A1* | 9/2010 | Ascari .................. B25J 9/1612 |
| | | 702/190 |
| 2010/0292842 A1 | 11/2010 | Takahashi |
| 2012/0004774 A1 | 1/2012 | Umetsu |

FOREIGN PATENT DOCUMENTS

| | | |
|---|---|---|
| CN | 206123698 U | 4/2017 |
| EP | 1645374 A1 | 4/2006 |
| EP | 2460628 A2 | 6/2012 |
| JP | H103196983 A | 8/1991 |
| JP | H110100089 A | 4/1998 |
| JP | 2002113685 A | 4/2002 |
| JP | 2005349491 A | 12/2005 |
| JP | 2006102920 A | 4/2006 |
| JP | 2006315128 A | 11/2006 |
| JP | 2008119770 A | 5/2008 |
| JP | 2009066683 A | 4/2009 |
| JP | 2010064155 A | 3/2010 |
| JP | 2010264544 A | 11/2010 |
| JP | 2012011531 A | 1/2012 |
| JP | 4890199 B2 | 3/2012 |
| JP | 5289179 B2 | 9/2013 |
| JP | 6057862 B2 | 1/2017 |

OTHER PUBLICATIONS

Japanese Search Report by Registered Searching Authority dated Feb. 21, 2019, for Japanese Patent Application No. 2017-129480.
Chinese Office Action dated Mar. 12, 2020, for Chinese Patent Application No. 201810684144.1.

* cited by examiner

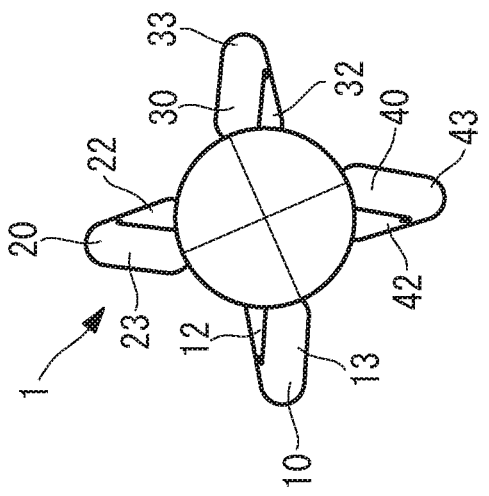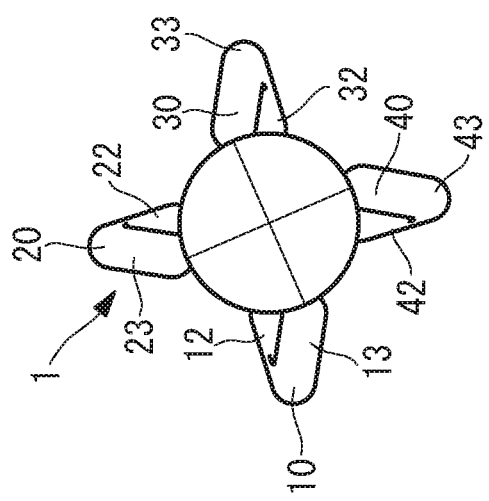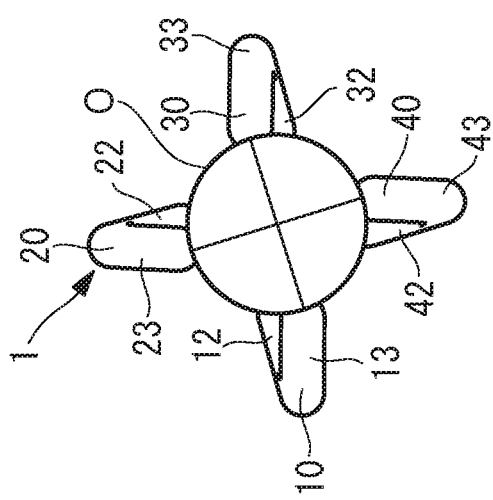

FIG. 1D
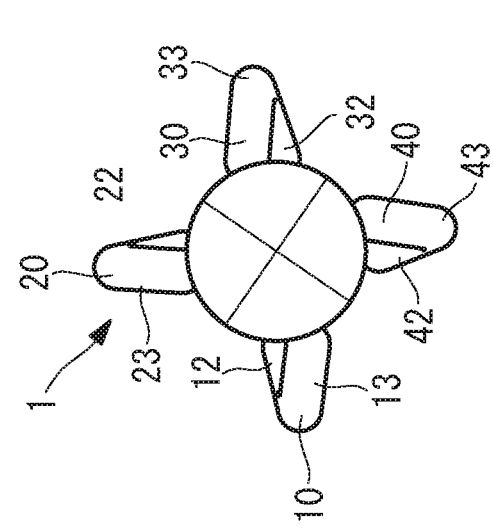
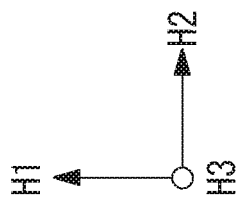
FIG. 1E
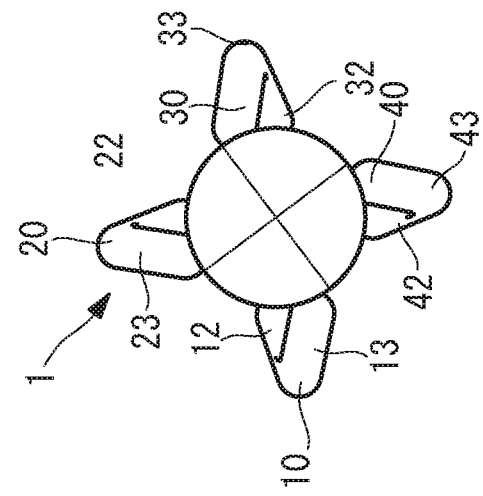
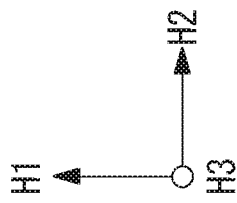

GRIPPER CONTROL DEVICE, GRIPPER CONTROL METHOD, AND GRIPPER SIMULATION DEVICE

CROSS-REFERENCE TO RELATED APPLICATIONS

This application is based on and claims priority to Japanese Patent Application No. 2017-129480, filed on Jun. 30, 2017, the entire content of which is incorporated herein by reference.

FIELD OF THE INVENTION

The present invention relates to a gripper control device, a gripper control method, and a simulation device for a gripper.

BACKGROUND OF THE INVENTION

In recent years, there is a proposed method for controlling changing the position and posture of a grasped object related to gripper (in-hand manipulation) by using a multi-fingered gripper (e.g., Japanese Patent No. 4890199). Japanese Patent No. 4890199 proposes a technique of carrying out an in-hand manipulation while maintaining balance of the object by measuring actual contact points (contact positions) between the object and the gripper as well as actual force vectors (contact force vectors) acting on the object by using tactile sensors attached to the fingers. This method adjusts the magnitude and direction of each contact force to let the total force and the total moment generated by these forces become zero. To achieve this, they remove several contacted fingers from the object and reposition those fingers to touch the object again in new positions and directions to get desired contact forces.

Another proposed method creates a series of complicated motion plans to execute state transitions using a two-fingered gripper, to reposition an object through multiple steps (e.g., Japanese Patent No. 6057862).

Furthermore, there is another proposed control method which lifts up an object, holds it and changes its posture, only using the degree-of-freedom of the robot arm to which the gripper is attached. However, it does not use the degree-of-freedom of the gripper (e.g., Japanese Patent No. 5289179).

SUMMARY OF THE INVENTION

A first aspect of the present invention provides a gripper control device for controlling a gripper that grasps an object with a plurality of fingers, the gripper control device including: a controller; and a memory storing a program, based on the program, the controller is configured to conduct: a grasp quality evaluation process to obtain a grasp quality contribution degree for each of a plurality of contact positions at which multiple fingers that support the object are in contact with the object, the grasp quality contribution degree indicating contribution degree to the grasp stability of the object; a finger-to-be-moved determination process to determine, as a finger-to-be-moved, at least one of the fingers corresponding to at least one of the contact positions at which the grasp quality contribution degree is low; and a finger movement control process to send a control command to a finger driving apparatus, the control command being one for moving the determined finger-to-be-moved with respect to the object, wherein the grasp quality contribution degree for each contact position is defined using at least one of following elements: relative locations of the plurality of contact positions related to the object; and friction coefficients between the object and the fingers respectively at the plurality of contact position.

A second aspect of the present invention provides a gripper control method for controlling a gripper that grasps an object with a plurality of fingers, the method comprising: obtaining a grasp quality contribution degree for each of a plurality of contact positions at which multiple fingers that support the object are in contact with the object, the grasp quality contribution degree indicating contribution degree to grasp stability of the object; and determining, as a finger-to-be-moved, at least one of the fingers corresponding to at least one of the contact positions at which the grasp quality contribution degree is low, wherein the grasp quality contribution degree for each contact position is defined by using at least one of the following elements: relative locations of the plurality of contact positions related to the object; and friction coefficients between the object and the fingers respectively at the plurality of contact positions.

A third aspect of the present invention provides a gripper simulation device for simulating a gripper that grasps an object with a plurality of fingers, the gripper simulation device comprising: a controller; and a memory storing a program, based on the program, the controller is configured to conduct: a grasp quality evaluation process configured to obtain a grasp quality contribution degree for each of a plurality of contact positions at which multiple fingers that support the object are in contact with the object, the grasp quality contribution degree indicating contribution degree to grasp stability of the object; and a finger-to-be-moved determination process to determine, as a finger-to-be-moved to be moved with respect to the object, at least one of the fingers corresponding to at least one of the contact positions at which the grasp quality contribution degree is low, wherein the grasp quality contribution degree for each of the plurality of contact positions is defined using at least one of the following elements: relative locations of the plurality of contact positions related to the object; and friction coefficients between the object and the fingers respectively at the plurality of contact positions.

BRIEF DESCRIPTION OF THE DRAWINGS

FIG. 1A is a diagram illustrating one example of a grasping state of a gripper controlled by a gripper control device due to one embodiment of the present invention.

FIG. 1B is a diagram illustrating one example of a grasping state of a gripper controlled by a gripper control device due to one embodiment of the present invention.

FIG. 1C is a diagram illustrating one example of a grasping state of a gripper controlled by a gripper control device due to one embodiment of the present invention.

FIG. 1D is a diagram illustrating one example of a grasping state of a gripper controlled by a gripper control device due to one embodiment of the present invention.

FIG. 1E is a diagram illustrating one example of a grasping state of a gripper controlled by a gripper control device due to one embodiment of the present invention.

DESCRIPTION OF EMBODIMENT(S) OF THE INVENTION

Hereinafter, a gripper control device according to an embodiment of the present invention will be described with reference to the drawings. This gripper control device is to control a gripper 1 as illustrated in FIG. 1A to FIG. 1E and FIG. 2A to FIG. 2C, for example.

As illustrated in FIG. 1A to FIG. 1E, the gripper 1 grasps an object O with multiple fingers 10, 20, 30, and 40, and moves these fingers 10, 20, 30, and 40 to change the relative position and posture of the object O with respect to the gripper 1.

As illustrated in FIG. 1A to FIG. 1E and FIG. 2A to FIG. 2C, for example, it is possible to lift up the object O which has a cylindrical or spheroid shape while rotating it around its central axis. The movements of the object O in FIG. 1A to FIG. 1E and FIG. 2A to FIG. 2C are mere examples, and it is also possible to change the posture of the object O while moving it along a different direction. For example, the object O can be rotated around different axial lines on H1, H2, or H3 shown in FIG. 1A. In this embodiment, as an example, a case in which the object O is lifted upward while being rotated around its central axis is described.

Here, while the object O can be any other object, this embodiment describes, as an example, a case in which the object O with a cylindrical shape is grasped by the multiple fingers 10, 20, 30, and 40.

Furthermore, while any gripper that has multiple fingers and each finger contains at least one rotational joint can be used, a gripper having a base portion (a palm) 50 and the multiple fingers 10, 20, 30, and 40 supported by the base portion 50 as illustrated in FIG. 1A to FIG. 1E and FIG. 2A to FIG. 2C is used as the gripper 1 in this embodiment as an example.

Figure 2A:
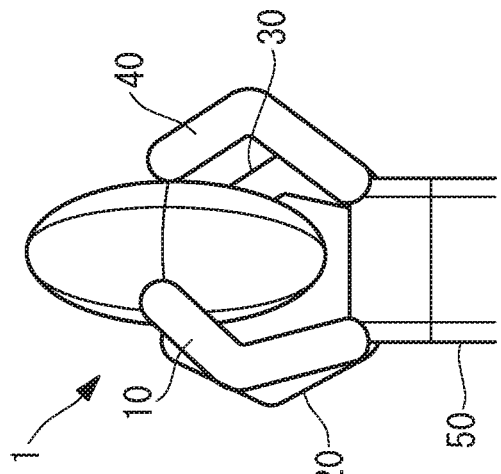
FIG. 2A is a diagram illustrating another example of the grasping state of the gripper controlled by the gripper control device due to one embodiment.
Figure 2B:
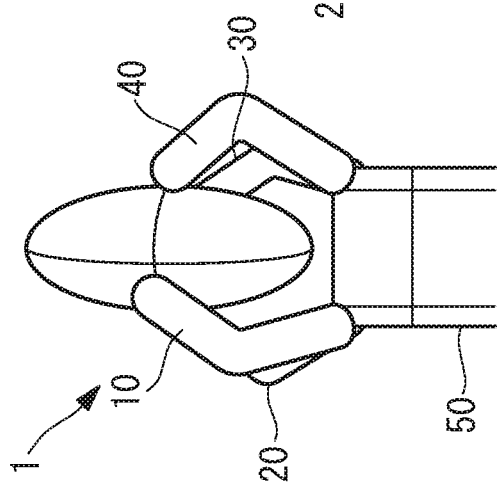
FIG. 2B is a diagram illustrating another example of the grasping state of the gripper controlled by the gripper control device due to one embodiment.
Figure 2C:
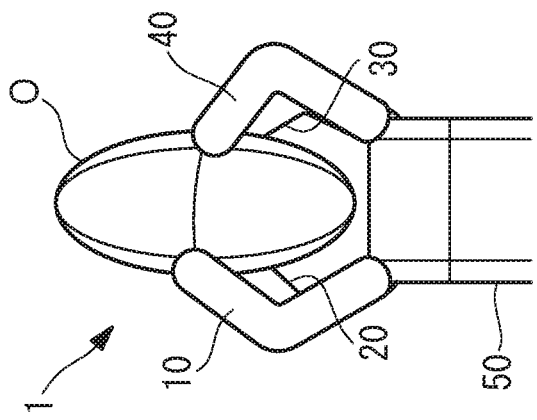
FIG. 2C is a diagram illustrating another example of the grasping state of the gripper controlled by the gripper control device due to one embodiment.
Figure 3:
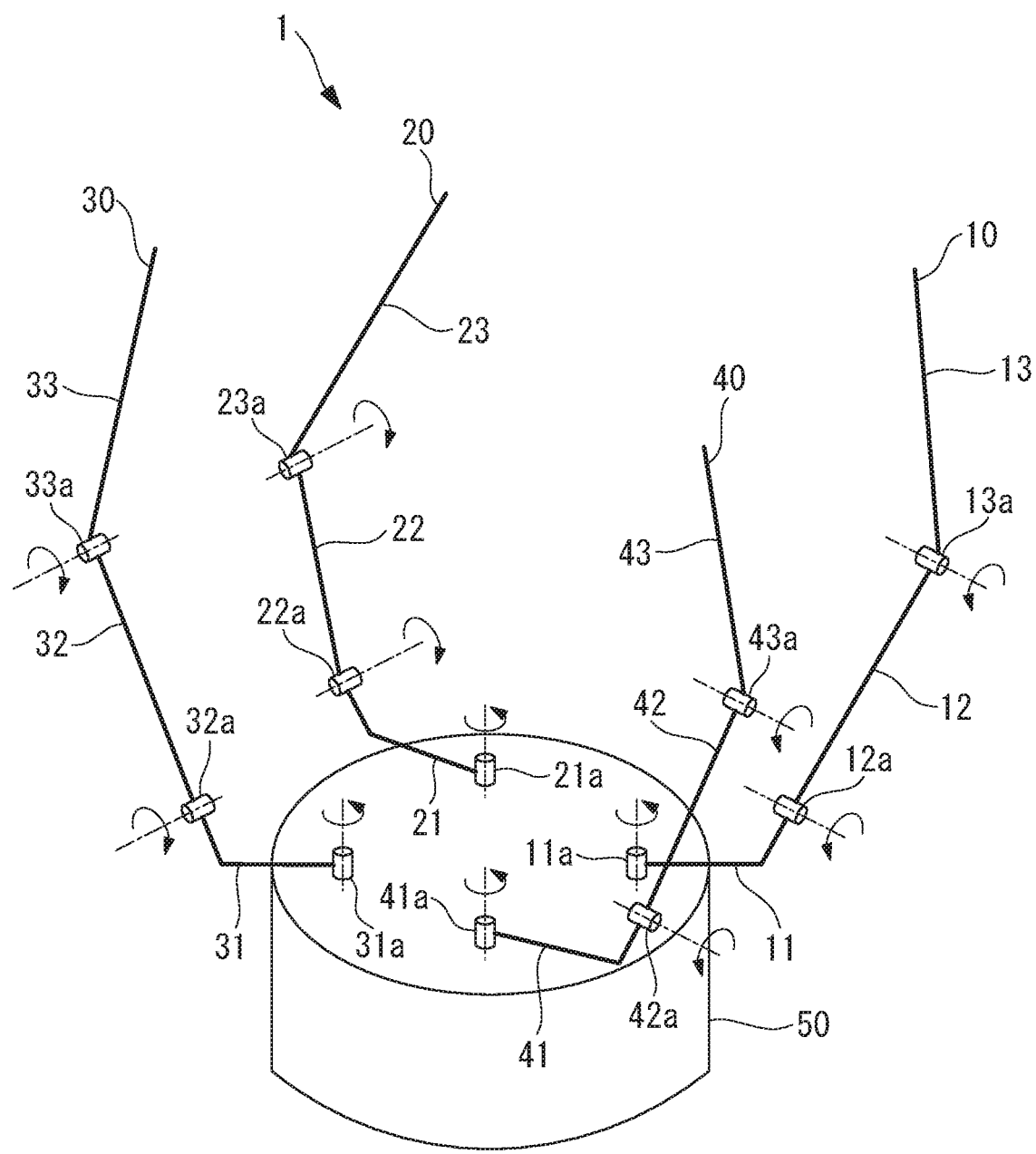
FIG. 3 is a schematic block diagram of the gripper used in the embodiment.
Figure 4:
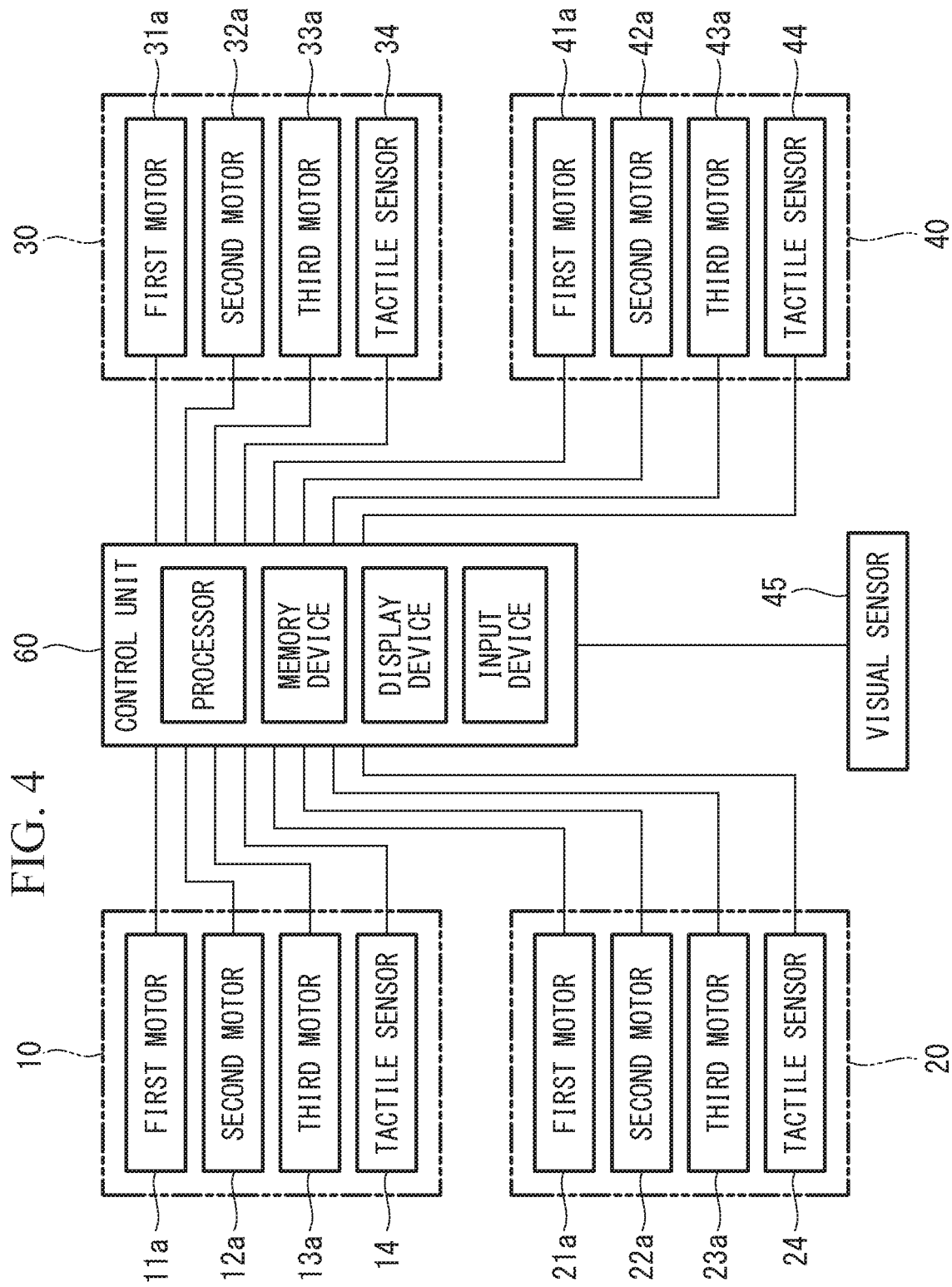
FIG. 4 is a functional block diagram illustrating a main part of the gripper control device due to the embodiment.

As illustrated in FIG. 3, multiple fingers 10, 20, 30, and 40 respectively include: first finger portions 11, 21, 31, and 41 each having a base end supported by the base portion 50; second finger portions 12, 22, 32, and 42 each having a base end supported by the tip end of corresponding one of the first finger portions 11, 21, 31, and 41; and third finger portions 13, 23, 33, and 43 each having a base end supported by the tip end of corresponding one of the second finger portions 12, 22, 32, and 42. Here, in FIG. 1A to FIG. 1E and FIG. 2A to FIG. 2C, the first finger portions 11, 21, 31, and 41 are not shown, as being disposed within the base portion 50 or under the object O.

Furthermore, multiple fingers 10, 20, 30, and 40 respectively include: first motors 11a, 21a, 31a, and 41a that respectively drive the first finger portions 11, 21, 31, and 41 to rotate around corresponding vertical axial lines with respect to the base portion 50; second motors 12a, 22a, 32a, and 42a that respectively drive the second finger portions 12, 22, 32, and 42 to rotate around corresponding axial lines perpendicular to longitudinal direction of the first finger portions 11, 21, 31, and 41; and third motors 13a, 23a, 33a, and 43a that respectively drive the third finger portions 13, 23, 33, and 43 to rotate around corresponding axial lines perpendicular to longitudinal direction of the second finger portions 12, 22, 32, and 42 (cf. FIG. 3).

The first motors 11a, 21a, 31a, and 41a, the second motors 12a, 22a, 32a, and 42a, and the third motors 13a, 23a, 33a, and 43a serve as a driving section to drive the corresponding fingers 10, 20, 30, and 40, and are connected to a control unit (control section) 60.

The control unit 60 is configured as a computer including a processor such as a CPU, a memory device such as a hard disk, a RAM, or a ROM, an input device, a display device . . . and so on.

The first motors 11a, 21a, 31a, and 41a, the second motors 12a, 22a, 32a, and 42a, and the third motors 13a, 23a, 33a, and 43a are motors each having a rotational position detector such as an encoder and therefore are capable of controlling the rotational position thereof, and are configured in a way that a value detected by the rotational position detector will be sent to the control unit 60. It is also possible to use a value detected by an angular sensor, which is provided for each joint of the fingers 10, 20, 30, and 40, as a replace of the rotational position detector. It is also possible to use both of these values.

In either case, a joint angle of the base end portion of each of the first finger portions can be obtained by the rotational position detector of corresponding one of the first motors 11a, 21a, 31a, and 41a or the angular sensor, a joint angle between the first finger portion and a corresponding second finger portion can be obtained by the rotational position detector of corresponding one of the second motors 12a, 22a, 32a, and 42a or the angular sensor, and a joint angle between the second finger portion and a corresponding third finger portion can be obtained by the rotational position detector of corresponding one of the third motors 13a, 23a, 33a, and 43a or the angular sensor. In other words, the rotational position detectors and the angular sensors serve as joint angle detectors.

Further, in the memory device, the control unit 60 stores movable ranges of the first motors 11a, 21a, 31a, and 41a, movable ranges of the second motors 12a, 22a, 32a, and 42a, and movable ranges of the third motors 13a, 23a, 33a, and 43a. Each of the movable ranges indicates a range in which the joint of the fingers 10, 20, 30, and 40 can move while considering the relation to the base portion 50, other joints, other obstacles, and so on. It can be a range manually set.

There is a case, for example, in which the object O may not be successfully manipulated by the fingers 10, 20, 30, and 40 when the tip ends of the first finger portions 11, 21, 31, and 41 of the fingers 10, 20, 30, and 40 are positioned outside an outer peripheral surface of the base portion 50. Here, each of the first motors 11a, 21a, 31a, and 41a is configured to rotate max to 45 degrees in either side around an rotational center located at a position where the central axial line of a corresponding one of the first finger portions 11, 21, 31, and 41 is set along a radial direction of the base portion 50, and this range of rotational motion corresponds to a movable range of this motor. The movable range and the center of this range are also set for each of the second motors 12a, 22a, 32a, and 42a, and the third motors 13a, 23a, 33a, and 43a.

Further, the fingers 10, 20, 30, and 40 are equipped with tactile sensors 14, 24, 34, and 44, respectively. The tactile sensors 14, 24, 34, and 44 can be distributed pressure sensors for example, which are implemented on the fingertips of the fingers 10, 20, 30, and 40, and each sensor can detect a pressure distribution for a certain contact position when the corresponding fingertip of the fingers 10, 20, 30, and 40 is driven to get in contact with the object O.

Here, we show an example to explain how the four fingers 10, 20, 30, and 40 move during the manipulation of the object O while referring to FIG. 1A to FIG. 1E. In FIG. 1A, the fingertips of the fingers 10, 20, 30, and 40 are in contact with the outer peripheral surface of the object O with a contact force which is large enough to grasp the object O without dropping. Under this situation, by driving the motors of the joints of the fingers 10, 20, 30, and 40 to provide a contact force needed to let the object O rotate around the central axis, the object O is rotated to a position as shown in FIG. 1B. At this time, the fingertips of the fingers 10, 20, 30, and 40 move with respect to the base portion 50, and postures of the fingers 10, 20, 30, and 40 has changed.

Since the postures that the fingers 10, 20, 30, and 40 can take and the ranges in which the fingers 10, 20, 30, and 40 can move are limited, it is not possible to let the object O rotate around its central axis continuously for 360 degrees in the same direction without changing the location of the contact position for each fingertip of the fingers 10, 20, 30, and 40 as shown in FIG. 1A and FIG. 1B.

Therefore, while the object O is manipulated to rotate around its central axis with respect to the gripper 1, the finger 10, chosen from the four fingers 10, 20, 30, and 40, is chosen as the finger-to-be-moved that will be repositioned to another contact location while moving backward (FIG. 1C), after this, other fingers 20, 30, and 40 will be chosen one by one as the finger-to-be-moved, moving backward, similar to the finger 10, and be repositioned to another contact location (FIG. 1D). By repeating such movements, the contact positions between the object O and the fingers 10, 20, 30, and 40 are sequentially changed (FIG. 1E), and the object O is rotated around its central axis with respect to the gripper 1.

In order to move the object O with respect to the gripper 1 under such a rule depicted above, for example, as shown in FIG. 1B, when changing the contact positions between the object O and the fingers 10, 20, 30, and 40, just like changing the contact position of the finger 10, we need to grasp the object stably and manipulate (rotate and move) it continuously without dropping. As a result, we need a process to determine the optimal finger with the lowest risk to unbalance and drop the object O if we choose it as the finger-to-be-moved, the optimal timing to move the pre-determined finger-to-be-moved with the lowest risk, as well as an optimal new contact position to which the finger should be repositioned to get a most stable new contact state. Such an ideal process is described with reference to a functional block diagram showing functions of the control unit 60 (FIG. 5 to FIG. 11), a process is described, and the process is for determining a contact position of a finger and timing to be changed, as well as a position to which the finger should be moved, in order to move the object O with respect to the hand 1 in this manner, for example, in order to stably hold and continuously manipulate (rotate and move) the object without dropping the object when the contact positions between the object O and the fingers 10, 20, 30, and 40 are changed as in the case in which the contact position of the finger 10 is changed in FIG. 1(B).

Figure 5:
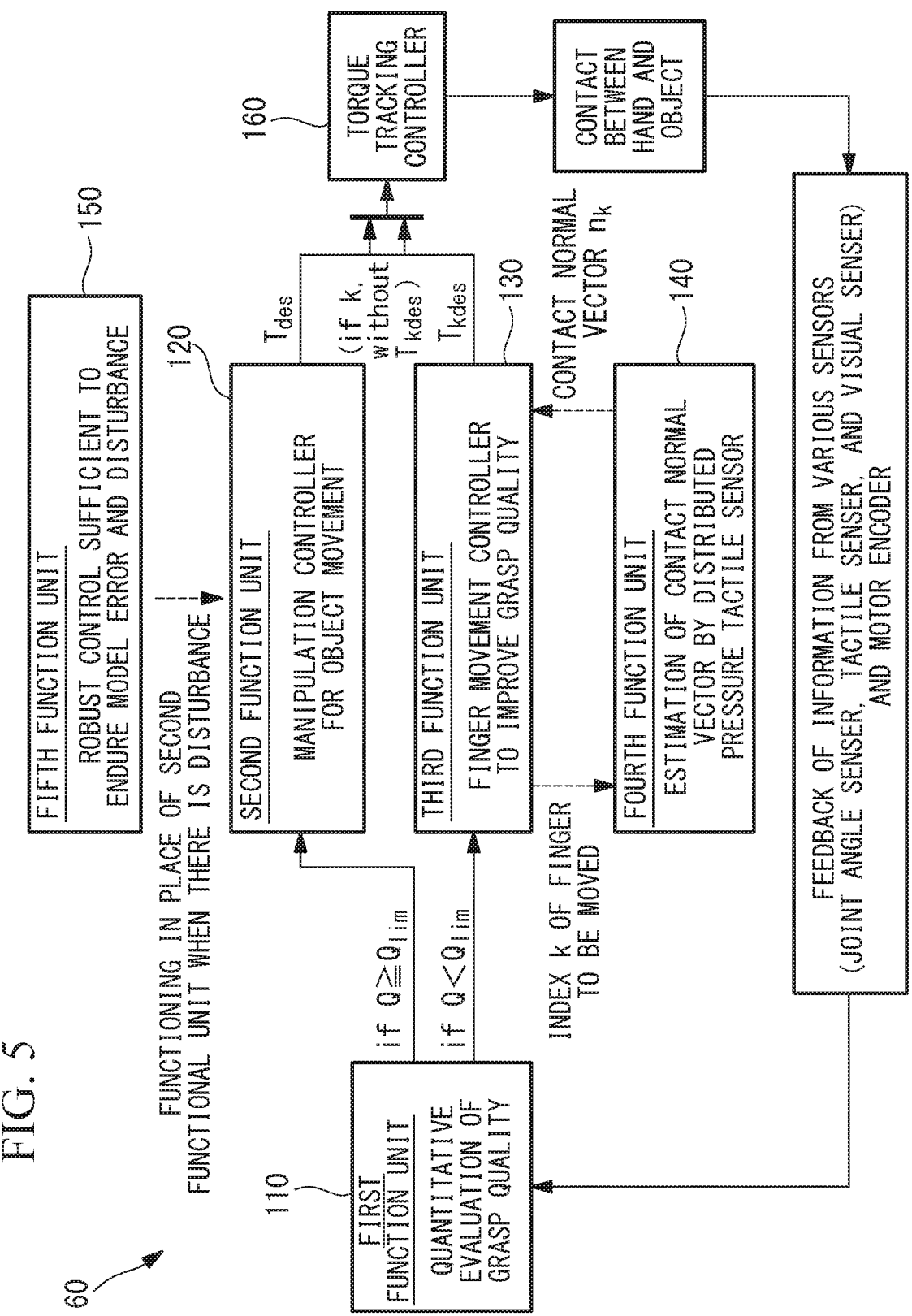
FIG. 5 is a functional block diagram illustrating a main part of the gripper control device due to the embodiment.

A functional block diagram shown by FIG. 5 illustrates an overall function of the control unit 60 to control the motors. As illustrated in FIG. 5, the control unit 60 includes first to fifth function units 110, 120, 130, 140, and 150. Each of the first to fifth function units 110, 120, 130, 140, and 150 may be a program stored in the memory device of the control unit 60 to drive the processor of the control unit 60 to operate, or may be implemented as a component configured by a microcomputer including a processor, a memory device, and the like.

The first function unit 110 calculates a grasp quality evaluation value Q every pre-determined time period or on a pre-determined control cycle, and compares the grasp quality evaluation value Q with a threshold value $Q_{lim}$. The grasp quality evaluation value Q indicates how hard an object can be dropped and how stably the object is grasped in a certain state in which the multiple fingers 10, 20, 30, and 40 grasp the object. The grasp quality evaluation value Q and the threshold value $Q_{lim}$ will be described in detail in the description of the first function unit 110.

If the grasp quality evaluation value Q calculated by using all the fingers 10, 20, 30, and 40 that are in contact with the object, is equal to or larger than the threshold value $Q_{lim}$, a control target value of each motor at least including a desired torque $T_{des}$ of the motor is calculated in order to use all of the fingers 10, 20, 30, and 40 for controlling object motion by the second function unit 120 to realize a desired position and posture of the object O.

If the grasp quality evaluation value Q is smaller than the threshold value $Q_{lim}$, the third function unit 130 calculates grasp quality contribution degrees $Q_{10}$, $Q_{20}$, $Q_{30}$, and $Q_{40}$ respectively for the multiple fingers 10, 20, 30, and 40, and determines the fingers whose calculated grasp quality contribution degrees are lower (for example, the finger 10, whose contribution $Q_{10}$ is the lowest) as the finger-to-be-moved, and outputs the index k (e.g., "10") of this finger. The fingers (e.g., the fingers 20, 30, and 40) which have not been determined as finger-to-be-moved, are utilized for object motion control by the second function unit 120, and a desired torque $T_{des}$ of each motor (excluding the motors driving the finger 10) is calculated at least as one of the control target values, to realize the desired position and posture of the object O. The second function unit 120 will also be described later in detail.

The determined finger-to-be-moved (e.g., the finger 10) is used for controlling finger movement to improve the grasp quality by the third function unit 130. In order to move the determined fingers (e.g., the finger 10) to improve the grasp quality evaluation value Q, the third function unit 130 calculates a control target value, at least including a desired torque $T_{kdes}$ (e.g., $T_{10des}$), of the motor of each joints of the fingers. The third function unit 130 will also be described later in detail.

The desired torques $T_{des}$ and $T_{kdes}$ are supplied to a torque tracking controller 160, and the torque tracking controller 160 uses the desired torque $T_{des}$ and $T_{kdes}$ to drive the motors. As a result, each of the fingers 10, 20, 30, and 40 is driven to get in contact with the object O, a desirable contact force occurs at each contact position, and the object O is manipulated to the desired position and posture with the desirable contact force. Further, when the grasp quality evaluation value Q is smaller than the threshold value Qlim, the contact position of the determined fingers (e.g., the finger 10) is changed to a better location, the grasp quality evaluation value Q has been improved, and thus a grasp quality to hold the object O with all of the fingers 10, 20, 30, and 40 is improved.

Next, information such as detected values of the rotational position detectors of the motors and the tactile sensors 14, 24, 34, and 44, a detection result of a current position and posture of the object detected by an object detection section such as a visual sensor 45 that takes an image of the fingers 10, 20, 30, and 40 and the object O, and such information will be input to the first function unit 110. Using these values, the grasp quality evaluation value Q is newly calculated by the first function unit 110, and the aforementioned controls by the first function unit 110, the second control unit 120, and the third function unit 130 are repeated. The control described above sequentially changes the contact positions of the fingers 10, 20, 30, and 40, and to cause a relative position and posture of the object O with respect to the gripper 1 to follow its targeted value.

By inputting the data of a three-dimensional shape of the object to the control unit 60, it is possible to estimate contact normal vectors at the contact positions between the object O and the fingertips of the fingers 10, 20, 30, and 40. When this approach is not used, the fourth function unit 140 obtains contact normal vectors at the contact positions between the object O and the fingertips of the fingers 10, 20, 30, and 40, using output values (the contact position and the pressure distribution) from the tactile sensors 14, 24, 34, and 44 and data of the three-dimensional shapes of the fingers. The contact normal vectors obtained by such a method are used to calculate the control target value of each motor at least including the desired torque $T_{des}$ of each of the motors of the fingers 10, 20, 30, and 40. With this, without inputting the data of the three-dimensional shape of the object O to the control unit 60, it is possible to realize a grasp state of the object O in a variety of methods. The fourth function unit 140 will also be described later in detail.

The fifth function unit 150 performs robust control to manipulate the object O to the desired position and posture, even when there are model errors in weight, shape, and inertia of the object O that is grasped or when an unexpected external force is applied. With this, even in a case in which an unexpected external force is applied, such as when objects O that can be different in weight, shape, and the like from the model (e.g., many apples with similar weights and shapes) are to be grasped by the same gripper 1, or when surrounding objects fall down and make an unexpected external force to the object O while it is grasped and picked, it is possible to manipulate the object O without dropping it, and to realize highly robust control. The fifth function unit 150 will also be described later in detail.

Figure 6:
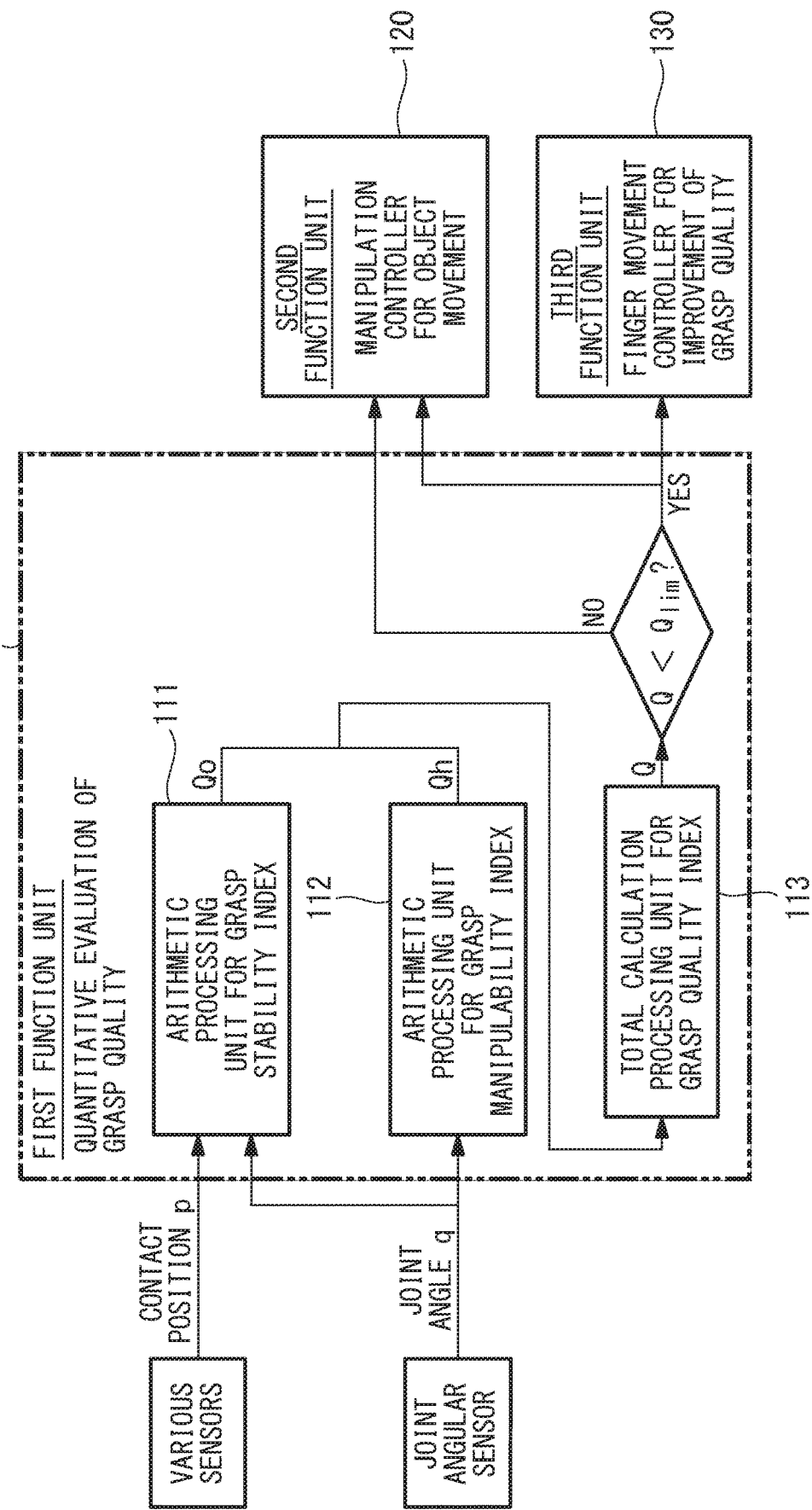
FIG. 6 is a functional block diagram illustrating a first function unit of the gripper control device due to the embodiment.

A functional block diagram of FIG. 6 shows an example of implementation of the first function unit 110.

The first function unit 110 calculates a grasp stability evaluation value $Q_o$ using an arithmetic processing unit 111 for arithmetic processing of a grasp stability index based on all of contact positions and joint angles of the multiple fingers 10, 20, 30, and 40 that are in contact with the object O, based on contact positions p between the object O and the fingertips of the fingers 10, 20, 30, and 40 obtained by the detected values by the tactile sensors 14, 24, 34, and 44, as well as based on joint angles q of the joints obtained by the detected values by the angular sensors provided for the joints of the fingers 10, 20, 30, and 40. In addition, based on the detected values by the angular sensors provided for the joints of the fingers 10, 20, 30, and 40, a grasp manipulability evaluation value $Q_h$ is calculated using an arithmetic processing unit 112 for arithmetic processing of a grasp manipulability index based on the joint angles of all of the multiple fingers 10, 20, 30, and 40.

Further, it is possible to obtain grasp stability contribution degrees $Q_{o10}$, $Q_{o20}$, $Q_{o30}$, and $Q_{o40}$ respectively for the multiple fingers 10, 20, 30, and 40 that are in contact with the object. Each of the grasp stability contribution degrees $Q_{o10}$, $Q_{o20}$, $Q_{o30}$, and $Q_{o40}$ obtained under this rule indicates a degree of contribution of corresponding one of the fingers 10, 20, 30, and 40 to grasp stability of the object O. It is also possible to obtain holding manipulability contribution degrees $Q_{h10}$, $Q_{h20}$, $Q_{h30}$, and $Q_{h40}$ respectively for the multiple fingers 10, 20, 30, and 40 that are in contact with the object. Each of the grasp manipulability contribution degrees $Q_{h10}$, $Q_{h20}$, $Q_{h30}$, and $Q_{h40}$ obtained under this rule indicates, in a current state of each of the fingers 10, 20, 30, and 40, how far it is from reaching the limit joint positions for each joints and thus losing the ability to manipulate the object, or how far it is from a singular posture in which it is not possible to generate desired speed in a certain direction to realize the desired position and posture of the object O.

The calculated $Q_o$ and $Q_h$ are substituted in a pre-determined expression by a total amount calculation processing unit 113 for a grasp quality index, and the grasp quality evaluation value Q which indicates the grasp stability evaluation value $Q_o$ and the grasp manipulability evaluation value $Q_h$ in a comprehensive manner is calculated. Further, the calculated $Q_{o10}$, $Q_{o20}$, $Q_{o30}$, and $Q_{o40}$ and $Q_{h10}$, $Q_{h20}$, $Q_{h30}$, and $Q_{h40}$ are substituted in a pre-determined expression by the total amount calculation processing unit 113, and the grasp quality contribution degrees $Q_{10}$, $Q_{20}$, $Q_{30}$, and $Q_{40}$ that respectively indicate the grasp stability contribution degrees $Q_{o10}$, $Q_{o20}$, $Q_{o30}$, and $Q_{o40}$ and the grasp manipulability contribution degrees $Q_{h10}$, $Q_{h20}$, $Q_{h30}$, and $Q_{h40}$ in a comprehensive manner are calculated. The pre-determined expression can be $Q_o$ and $Q_h$, or $Q_{o10}$, $Q_{o20}$, $Q_{o30}$, and $Q_{o40}$ and $Q_{h10}$, $Q_{h20}$, $Q_{h30}$, and $Q_{h40}$ are directly added, or $Q_o$ and $Q_h$, or $Q_{o10}$, $Q_{o20}$, $Q_{o30}$, and $Q_{o40}$ and $Q_{h10}$, $Q_{h20}$, $Q_{h30}$, and $Q_{h40}$ are added after both sides are multiplied by different weight coefficients.

Subsequently, the calculated grasp quality evaluation value Q is compared with the threshold value $Q_{lim}$, and if the grasp quality evaluation value Q is equal to or larger than the threshold value $Q_{lim}$, all of the fingers 10, 20, 30, and 40 are utilized for the object movement control by the second function unit 120. On the other hand, if the grasp quality evaluation value Q is smaller than the threshold value $Q_{lim}$, the fingers (e.g., the fingers 20, 30, and 40) which are not determined as fingers-to-be-moved, apparently excluding the finger which has the lowest grasp quality contribution degree (e.g., the finger 10 whose contribution degree $Q_{10}$ is the lowest) are utilized for the object movement control by the second function unit 120.

Here, the grasp stability evaluation value $Q_o$ and the grasp stability contribution degrees $Q_{o10}$, $Q_{o20}$, $Q_{o30}$, and $Q_{o40}$ can have different definitions. While there are also various methods for calculating the values and the contribution degrees and any of such methods can be applied, favorable methods among those will be described below.

First Example for Calculating Grasp Stability Evaluation Value $Q_o$ and Grasp Stability Contribution Degrees $Q_{o10}$, $Q_{o20}$, $Q_{o30}$, and $Q_{o40}$ In order to grasp the object O stably without dropping, it must been guaranteed that slipping between the object O and the fingers supporting the object O does not occur. Therefore, the grasp stability evaluation value $Q_o$ may be defined based on frictions and contact forces. More specifically, the grasp stability evaluation value $Q_o$ may be defined based on information such as: relative contact positions related to the object O; contact forces (magnitude and direction) at the respective contact points; and friction coefficients between the object O and the fingers 10, 20, 30, and 40.

For example, based on Coulomb friction model, if a friction force generated at each contact position between the object O and fingers 10, 20, 30, and 40, may has not exceeded a maximum static frictional force, under this situation, it is determined that slipping between the corresponding finger and the object O at the contact position does not occur. Specifically, for example, where a component $f_{ro}$ of a contact force f on a tangential plane (component on a plane vertical to a contact normal vector) does not exceed a maximum static frictional force $f_\mu = \mu f_\perp$ ($\mu$ is a Coulomb friction coefficient, and $f_\perp$ is the normal contact force, i.e., a component in the direction of contact normal vector of f), such a contact force f is a desired contact force with which slipping between the finger and the object O does not occur.

Figure 12:
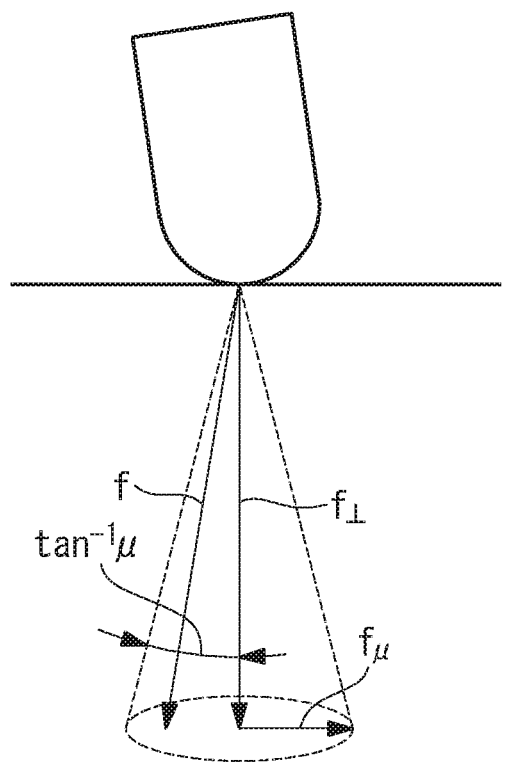
FIG. 12 is a diagram illustrating the force cone (a cone for contact force based on Coulomb friction model, also named as friction cone) used in the gripper control device due to the embodiment.

At each of the contact points, based on a Coulomb friction coefficient and a normal contact force $f_\perp$, a set of candidates of the contact force f with which slipping does not occur is a three-dimensional cone whose apex angle is $2 \tan^{-1}\mu$ (cf. FIG. 12). The three-dimensional cone is also named as friction cone or force cone.

Figure 13:
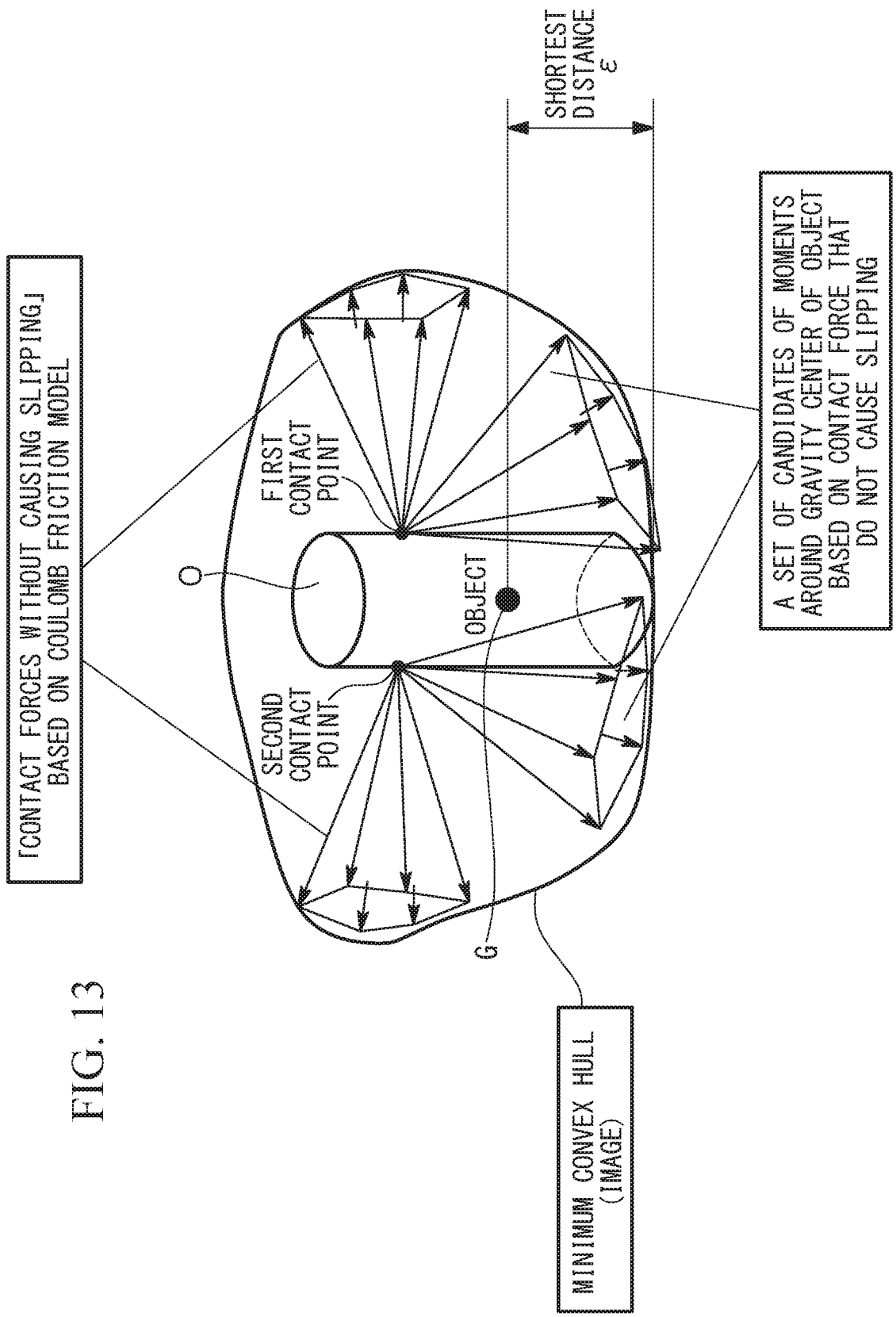
FIG. 13 is a diagram illustrating a minimum convex hull (also named as grasp wrench space) used in the gripper control device due to the embodiment.

A contact force for grasp the object O stably without causing slipping is required, and such an ideal contact force lies inside of the friction cone as shown in FIG. 12. A length of the vector of the normal contact force $f_L$ (a component of the corresponding contact force f in the direction of the contact normal vector) within a set of candidates that influences the size (volume) of the force cone is decided based on the value detected by the tactile sensors 14, 24, 34, and 44. As a single moment is produced about a gravity center G of the object O due to arbitrary one of the contact forces f inside the force cone, there is a moment cone corresponding to the force cone with the desirable contact forces (cf. FIG. 13). Such a desirable moment cone is defined based on the Coulomb friction coefficient $\mu$, the normal contact force $f_\perp$, and position vectors from the gravity center of the object O to each contact points, and is another three-dimensional cone having basis vectors which are different from basis vectors of the friction (force) cone.

For each contact points, there are a single set of candidates of the contact forces with which slipping between fingers and the object O does not occur (three-dimensional friction force cone), and a single set of candidates of the moments generated around the gravity center G of the object O by such contact forces (three-dimensional moment cone). The contact forces and the moments for grasping the object O stably without dropping are required to lie inside these cones. In this embodiment, a minimum convex set that contains all of the friction (force) cones and the moment cones at each contact points is referred to as a minimum convex hull relating to the grasp stability.

The minimum convex hull depicted above is a six-dimensional convex space, and also referred to as the grasp wrench space. The minimum convex hull is a set of stable candidates of desirable forces and desirable moments for grasp the object O stably.

If the gravity center of the object O is inside the convex hull (grasp wrench space), it can be determined that the grasp is stable. When the gravity center G of the object O exists inside the convex hull, and if the distance from the gravity center G to the boundary of the convex hull is long, the gravity center G is less likely to get outside the convex hull during the movement of the object O, and therefore the number of candidates of such desirable forces and desirable moments for stable grasping increases. In other words, as the number of combinations of a force and a moment that can balance the object O without causing slipping increases, the grasp stability (the grasp stability evaluation value $Q_o$) can be determined as high.

Further, when the volume of the convex hull becomes larger the gravity center of the object O is easier to be lie inside the convex hull, and the gravity center G is less likely to get outside the convex hull during the movement of the object O, the number of candidates of the forces and the moments for stable grasping increases. In other words, as the number of combinations of the forces and the moments that can balance the object O without causing slipping increases, the grasp stability (the grasp stability evaluation value $Q_o$) can be determined as high.

As an example of determination index, as in an expression (1) shown below, calculation is performed by defining a linear combination of the shortest distance $\epsilon$, from the gravity center G of the object O to the boundary of the convex hull, and a volume V of the convex hull as the grasp stability evaluation value $Q_o$.

Expression 1

$$Q_o = w_{11}\epsilon + w_{12}V \qquad (1)$$

Thus such a defined $Q_o$ can be used no matter how many contact points actually exist.

As a part of this embodiment, the grasp stability contribution degrees $Q_{o10}$, $Q_{o20}$, $Q_{o30}$, and $Q_{o40}$ are obtained respectively for the multiple fingers 10, 20, 30, and 40. First, the grasp stability contribution degree $Q_{o10}$ for the finger 10 is calculated such that a minimum convex set containing all of the force cones and the moment cones at all the contact points for all of the fingers 20, 30, and 40 while excluding the force cones and the moment cones at all the contact points for the finger 10 (a minimum convex hull of the grasp stability contribution degrees), is obtained, and the grasp stability contribution degree $Q_{o10}$ is calculated for the convex set using the expression (1). In other words, the grasp stability contribution degree $Q_{o10}$ for the finger 10 represents stability evaluation when the object O is grasped by the fingers 20, 30, and 40 without the finger 10.

Similarly, the grasp stability contribution degree is obtained for each of the fingers 20, 30, and 40, and with this, the grasp stability contribution degrees $Q_{o20}$, $Q_{o30}$, and $Q_{o40}$ are respectively obtained for multiple fingers 20, 30, and 40.

Figure 14:
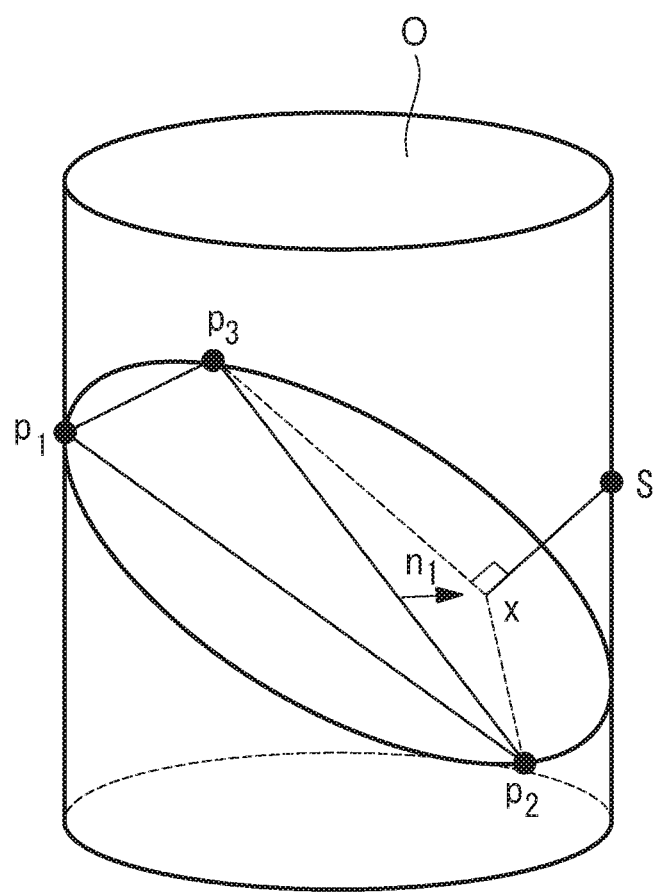
FIG. 14 is a diagram illustrating a plane projection method used for the gripper control device due to the embodiment.

Second Example for Obtaining Grasp Stability Evaluation Value $Q_o$ and Grasp Stability Contribution Degrees $Q_{o10}$, $Q_{o20}$, $Q_{o30}$, and $Q_{o40}$ While the grasp stability evaluation value $Q_o$ and the grasp stability contribution degrees $Q_{o10}$, $Q_{o20}$, $Q_{o30}$, and $Q_{o40}$ are defined in a three-dimensional level based on the frictions and the force vectors in the first example, there is a simplified method in which the grasp stability is geometrically considered in a two-dimensional level (cf. FIG. 14).

For example, when the contact to the object O is made by the fingers 10, 20, 30, and 40 at four contact points, one of the contact points is projected on a plane defined by the other three contact points, and an area of a quadrangle defined by the other three contact points and a point x which is the projection of the corresponding contact point, or a value calculated based on the area can be considered as the grasp stability evaluation value $Q_o$. It is determined that the larger the area of the quadrangle, the more stable the grasping is.

As a specific example, assuming that one of the contact points of the fingers 10, 20, 30, and 40 is taken as s, and that the remaining three contact points are taken as p1, p2, and p3, the area of the quadrangle is calculated, for each of the cases taking one of the fingers 10, 20, 30, and 40 as s, based only on positional information of the contact points as in an expression (2) shown below, and a smallest value out of the calculated values is defined to be the grasp stability evaluation value $Q_o$ to enable quantitative evaluation of the grasp stability.

Expression 2

$$Q_o = \text{Area}(p_1, p_2, p_3 \text{proj}(s)) \quad (2)$$

For example, each of p1, p2, p3, and s represents a position in a three-dimensional coordinate system taking the gravity center G of the object O as an origin (positional vector), and x in FIG. 14 represents a position of s projected on a plane that is defined by p1, p2, and p3. The grasp stability evaluation value $Q_o$ thus defined is effective when there are only four contact points.

As a part of this embodiment, the grasp stability contribution degrees $Q_{o10}$, $Q_{o20}$, $Q_{o30}$, and $Q_{o40}$ are calculated respectively for multiple fingers 10, 20, 30, and 40. First, the area of the quadrangle is calculated as described above assuming that the contact point of the finger 10 is s, and that the remaining contact points of the fingers 20, 30, and 40 are p1, p2, and p3, and the calculated area is taken as the grasp stability contribution degree $Q_{o10}$ for the finger 10. Similarly, the grasp stability contribution degrees $Q_{o20}$, $Q_{o30}$, and $Q_{o40}$ are respectively calculated for the fingers 20, 30, and 40. Thus, the grasp stability contribution degrees $Q_{o10}$, $Q_{o20}$, $Q_{o30}$, and $Q_{o40}$ are calculated for the fingers 10, 20, 30, and 40, respectively.

It should be noted that while the position s of the contact points and the gravity center of the object O in the three-dimensional coordinate are used in the first example and the second example, the first example and the second example can be implemented only using relative positions of the contact points and the gravity center of the object O.

In addition to the above two definition methods, as the grasp stability contribution degrees $Q_{o10}$, $Q_{o20}$, $Q_{o30}$, and $Q_{o40}$, it is possible to use a different index that is defined using contact positions, contact forces, and friction coefficients between the object O and the fingers 10, 20, 30, and 40.

As an example, in the first example, the grasp stability contribution degrees $Q_{o10}$, $Q_{o20}$, $Q_{o30}$, and $Q_{o40}$ for the corresponding fingers 10, 20, 30, and 40 may be respectively obtained using the force cones obtained for the corresponding fingers 10, 20, 30, and 40. Each of the force cones is a three-dimensional cone forming an angle $\tan^{-1}\mu$ centering a contact normal vector at the corresponding contact point, and represents a bundle of force vectors that can be applied at the corresponding contact point without causing the object O to slip.

For example, at one contact point, a volume of a force cone, an angle in a direction of the gravity center between a straight line connecting the contact point and the gravity center G of the object O and a contact normal line of this contact force cone are obtained, and the grasp stability contribution degrees $Q_{o10}$, $Q_{o20}$, $Q_{o30}$, and $Q_{o40}$ can be calculated such that a contribution degree to the grasp stability of the object O is evaluated to be high when the volume of the force cone is large and the angle in the direction of the gravity center is small, and the contribution degree to the grasp stability of the object O is evaluated to be low in an opposite case. By obtaining the grasp stability contribution degree for all of the contact points, it is possible to find a contact point at which a contribution degree to the grasp stability of the object O is low.

Further, if the object O is in a simple shape, and movable ranges of the fingers 10, 20, 30, and 40 are limited, there is a case in which the grasp stability contribution degrees $Q_{o10}$, $Q_{o20}$, $Q_{o30}$, and $Q_{o40}$ for the corresponding fingers 10, 20, 30, and 40 can be obtained without considering positions of the contact positions for the corresponding fingers 10, 20, 30, and 40 in the three-dimensional coordinate.

For example, if there are more than one object in an overall simple shape while conditions and precise shapes of the surfaces are not uniform like a box of apples for example, the direction of the contact normal vector of the force cone changes unambiguously according to the movement of corresponding one of the fingers 10, 20, 30, and 40, and the volume of the force cone and the formed angle ($\tan^{-1}\mu$) may change according to detection results by corresponding one of the tactile sensors 14, 24, 34, and 44.

Specifically, as the surfaces of apples has minute unevenness, which are detected by the tactile sensors 14, 24, 34, and 44, the friction coefficient at each of the contact points is adjusted using a detection result by corresponding one of the tactile sensors 14, 24, 34, and 44, and the force cone for each of the fingers 10, 20, 30, and 40 can be obtained using the adjusted value of $\mu$.

At one contact point, the volume of the force cone, a ratio, in $\tan^{-1}\mu$, of an angle in the direction of the gravity center between the straight line connecting the contact point and the gravity center G of the object O and a contact normal line of this force cone are obtained, and the grasp stability contribution degrees $Q_{o10}$, $Q_{o20}$, $Q_{o30}$, and $Q_{o40}$ may be calculated such that a contribution degree to the grasp stability of the object O is evaluated to be high when the volume of the force cone is large and the ratio is small, and the contribution degree to the grasp stability of the object O is evaluated to be low in an opposite case.

As another example, in the first example, the grasp stability contribution degrees $Q_{o10}$, $Q_{o20}$, $Q_{o30}$, and $Q_{o40}$ for the corresponding fingers 10, 20, 30, and 40 may be respectively obtained using the moment cones obtained for the corresponding fingers 10, 20, 30, and 40. Each of the moment cones represents a bundle of moments that are generated around the gravity center G of the object O at the corresponding contact point by the contact forces.

For example, at one contact point, a volume of a moment cone, an angle in a direction of the gravity center between a straight line connecting the contact point and the gravity center G of the object O and a central axial line of this moment cone are obtained, and the grasp stability contribution degrees $Q_{o10}$, $Q_{o20}$, $Q_{o30}$, and $Q_{o40}$ may be calculated such that a contribution degree to the grasp stability of the object O is evaluated to be high when the volume of the moment cone is large and the angle in the direction of the gravity center is small, and the contribution degree to the grasp stability of the object O is evaluated to be low in an opposite case. By obtaining the grasp stability contribution degrees for all of the contact points, it is possible to find a contact point at which a contribution degree to the grasp stability of the object O is low.

The grasp manipulability evaluation value $Q_h$ or the grasp manipulability contribution degrees $Q_{h10}$, $Q_{h20}$, $Q_{h30}$, and $Q_{h40}$ may also be defined from a variety of aspects. While there are also various methods for obtaining the values and the contribution degrees and any of such methods can be employed, favorable methods among those will be described below.

For example, the grasp manipulability evaluation value $Q_h$ can be defined considering a degree of influence of a restriction due to the movement limit of each of the finger joints to manipulability of the object O. In this case, for each of the finger joints, using information on a current position $q^i_j$ of a joint (a joint angle of an i-th joint of a j-th finger) and the movement limits of this joint (a minimum value $q^i_{min,j}$ and a maximum value $q^i_{max,j}$ of the joint movable range), the square of a difference between the current position $q^i_j$ of the joint and the center position of the joint $(q^i_{min,j}+q^i_{max,j})/2$ is calculated and multiplied by −1, and then a result of this calculation can be defined as the grasp manipulability evaluation value $Q_h$.

Expression 3

$$Q_h = -\sum_{j=1}^{N_{finger}} \sum_{i=1}^{N_{joint}} \left( \frac{q^i_j - \bar{q}^i_j}{q^i_{max,j} - q^i_{min,j}} \right)^2 \quad (3)$$

Expression 4

$$\bar{q}^i_j = (q^i_{max,j} + q^i_{min,j})/2 \quad (4)$$

Further, the grasp manipulability contribution degrees $Q_{h10}$, $Q_{h20}$, $Q_{h30}$, and $Q_{h40}$ are calculated for the fingers 10, 20, 30, and 40, respectively. Specifically, values obtained by calculation carried out by substituting j=10, j=20, j=30, and j=40 in an expression below are respectively taken as $Q_{h10}$, $Q_{h20}$, $Q_{h30}$, and $Q_{h40}$.

Expression 5

$$Q_{hj} = -\sum_{i=1}^{N_{joint}} \left( \frac{q^i_j - \bar{q}^i_j}{q^i_{max,j} - q^i_{min,j}} \right)^2 \quad (5)$$

By solving an optimization problem so that $Q_h$ is maximized, a control signal for driving each of the finger joints back to the center position of this joint is always generated. With this, each of the finger joints continues to move while the finger joint is always far from the movement limit (the minimum value $q^i_{min,j}$ and the maximum value $q^i_{max,j}$ of the joint operating range).

Further, there is also a method in which a result of calculation carried out by substituting a matrix J including Jacobian matrices for the fingers in an expression (6) below is defined as $Q_h$.

Expression 6

$$Q_h = k(\det(JJ^T))^{1/2} = k(\sigma_1 \sigma_2 \ldots \sigma_n) \quad (6)$$

Each of the grasp manipulability contribution degrees $Q_{h10}$, $Q_{h20}$, $Q_{h30}$, and $Q_{h40}$ is calculated by substituting a matrix J only containing the Jacobian matrix for corresponding one of the fingers 10, 20, 30, and 40 in an expression (6).

If even one of singularity values $\sigma_1$, $\sigma_2$, ..., $\sigma_n$ of the matrix J becomes zero, the finger cannot be moved in a particular direction, and it is not possible to manipulate the object O in this direction. Here, k is a weight coefficient, $\det(X)$ is the determinant of a matrix X, and $J^T$ is a transposed matrix of the matrix J. By solving the optimization problem so that $Q_h$ is maximized in this manner, it is possible to prevent manipulability of the object O from being lost due to occurrence of a singular posture of a finger of a gripper.

The grasp manipulability evaluation value $Q_h$ or the grasp manipulability contribution degrees $Q_{h10}$, $Q_{h20}$, $Q_{h30}$, and $Q_{h40}$ are not limited to the above two types of definition, and are indices defined based on angle information for each of the finger joints of the gripper 1.

In this embodiment, the joint movable range and the center position of a joint respectively correspond to an movable range and a center position after an output from an output shaft of each of the motors is transmitted to each joint shaft via a transmission mechanism such as a gear, and then limitation by a mechanical structure of the gripper is added.

Based on the grasp stability evaluation value $Q_o$ and the grasp manipulability evaluation value $Q_h$ thus obtained, the grasp quality evaluation value Q is calculated as described above. Further, based on the grasp stability contribution degrees $Q_{o10}$, $Q_{o20}$, $Q_{o30}$, and $Q_{o40}$ and the grasp manipulability contribution degrees $Q_{h10}$, $Q_{h20}$, $Q_{h30}$, and $Q_{h40}$ thus obtained, the grasp quality contribution degrees $Q_{10}$, $Q_{20}$, $Q_{30}$, and $Q_{40}$ are calculated as described above.

Here, there are various types of specifications for the object O to be grasped and the fingers 10, 20, 30, and 40, and according to the specifications, it is possible to obtain the grasp quality evaluation value Q only using the grasp stability evaluation value $Q_o$ without using the grasp manipulability evaluation value $Q_h$. Further, the grasp quality contribution degrees $Q_{10}$, $Q_{20}$, $Q_{30}$, and $Q_{40}$ may be obtained only based on the grasp stability contribution degrees $Q_{o10}$, $Q_{o20}$, $Q_{o30}$, and $Q_{o40}$, without using the grasp manipulability contribution degrees $Q_{h10}$, $Q_{h20}$, $Q_{h30}$, and $Q_{h40}$.

On the other hand, the grasp quality evaluation value Q can be calculated by the total amount calculation processing unit 113, based on a linear combination of the grasp stability evaluation value $Q_o$ and the grasp manipulability evaluation value $Q_h$. Further, the grasp quality contribution degrees $Q_{10}$, $Q_{20}$, $Q_{30}$, and $Q_{40}$ can be calculated by the total amount calculation processing unit 113, based on a linear combination of the grasp stability contribution degree $Q_{o10}$ and the grasp manipulability contribution degree $Q_{h10}$, a linear combination of $Q_{o20}$ and $Q_{h20}$, a linear combination of $Q_{o30}$ and $Q_{h30}$, and a linear combination of $Q_{o40}$ and $Q_{h40}$, respectively. For example, these values can be calculated by accumulating operation respectively after multiplication of different weight coefficients.

Expression 7

$$Q = w_1 Q_o + w_2 Q_h \tag{7}$$

Expression 8

$$Q_{10} = w_{11} Q_{o10} + w_{21} Q_{h10} \tag{8}$$

Expression 9

$$Q_{20} = w_{12} Q_{o20} + w_{22} Q_{h20} \tag{9}$$

Expression 10

$$Q_{30} = w_{13} Q_{o30} + w_{23} Q_{h30} \tag{10}$$

Expression 11

$$Q_{40} = w_{14} Q_{o40} + w_{24} Q_{h40} \tag{11}$$

Figure 7:
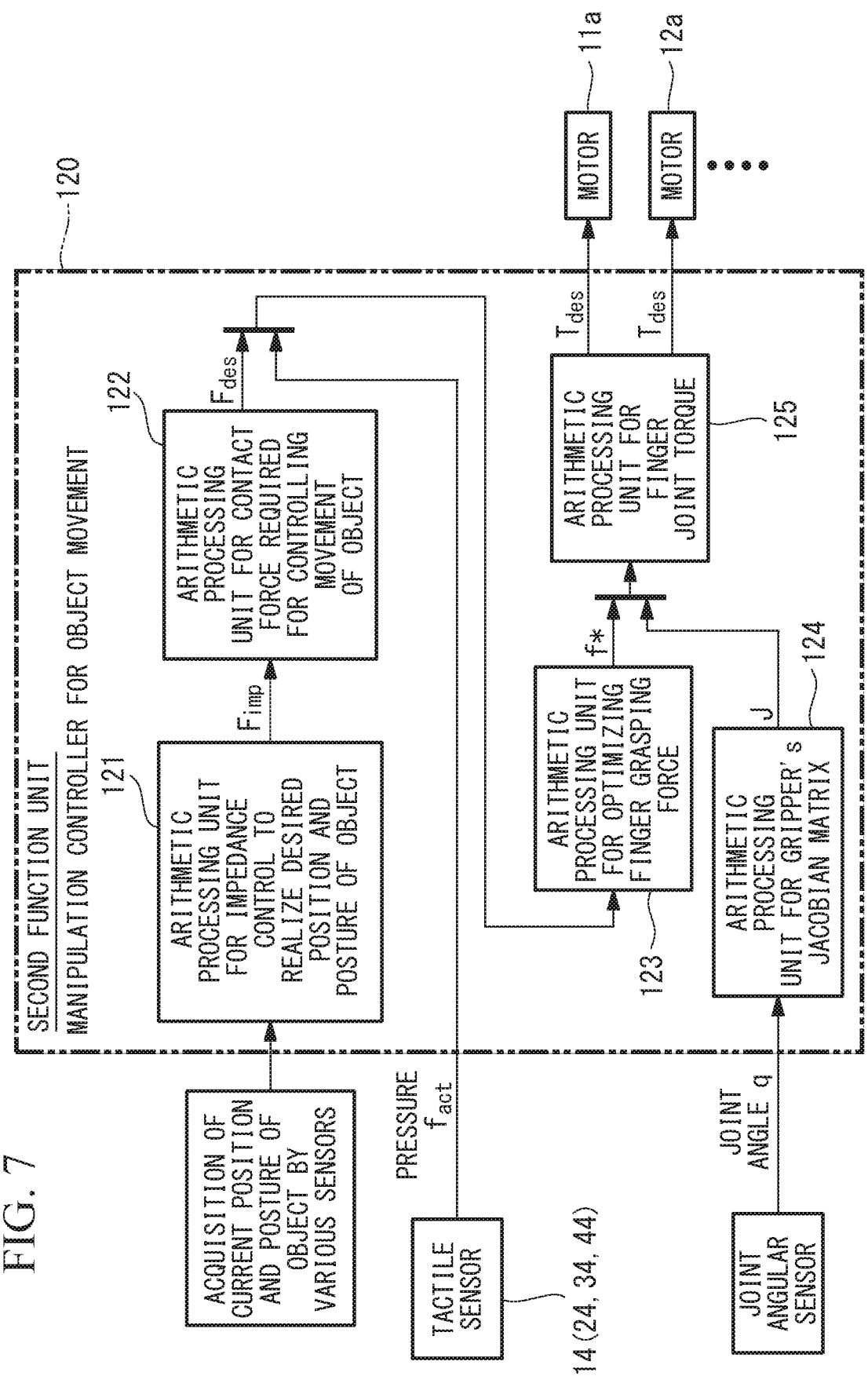
FIG. 7 is a functional block diagram illustrating a second function unit of the gripper control device due to the embodiment.

A functional block diagram of FIG. 7 shows an example of implementation of the second function unit 120.

Using information on a current position and posture of the object O obtained using information detected by various sensors, the second function unit 120 calculates an external force $F_{imp}$ required to converge a difference from the desired value and the current value of position and posture of the object O to be zero using an impedance control arithmetic processing unit 121 for realizing the desired position and posture of the object O. For example, values detected by various sensors contain information detected by a three-dimensional visual sensor, and such information can be detected by using several markers arranged on the surface of the object O to be detected by a three-dimensional laser sensor in order to detect the current position and posture of the object O.

The calculated $F_{imp}$ is an input to an arithmetic processing unit 122 for a contact force required for controlling the movement of the object, and a desirable contact force $F_{des}$ is calculated based on a dynamics model of the object (details will be described later). The calculated $F_{des}$ is an input to an arithmetic processing unit 123 for optimizing a finger grasping force. A current pressure $F_{act}$ at each of the contact positions detected by the tactile sensors is also an input to the arithmetic processing unit 123 for optimizing the finger holding force. By solving an optimization problem of the finger grasping force (details will be described later), a target grasping force f* by the gripper 1 is calculated. Further, an arithmetic processing unit 124 for a Gripper's Jacobian matrix calculates a Gripper's Jacobian matrix J using a current joint angle q detected by an angular sensor attached to each of the joints of the fingers 10, 20, 30, and 40 of the gripper 1, the calculated value is an input to an arithmetic processing unit 125 for finger joint torque, reverse conversion to f* is performed, such as a centrifugal force that depends on a joint speed is compensated, and then the desired torque $T_{des}$ for each of the finger joints of the gripper 1 is calculated.

The calculated desired torque $T_{des}$ is provided for a driving motor of each of the joints of the fingers 10, 20, 30, and 40, and thus the gripper 1 is driven. As a result, by driving the gripper 1 with the desired torque, the fingers 10, 20, 30, and 40 are driven to get in contact with the object O so that the target grasping force f*, and thus the desirable contact force $F_{des}$ is generated. Under the desirable contact force $F_{des}$, the object O is manipulated to the desired position and posture.

A dynamics model of the object is the dynamics model of the object model in which a contact force from the gripper 1 is considered as an external force while considering dynamics (acceleration and angular acceleration, speed and angular speed, position and posture) and a gravity force of the object. When the desirable contact force is calculated using this model, a target contact force in which the gravity force and an inertial force of the object O are always compensated is calculated.

The optimization problem of the finger grasping force is an optimization problem in which a desirable grasping force is determined such that a difference between the current contact force detected by the tactile sensors 14, 24, 34, and 44 respectively attached to the fingers 10, 20, 30, and 40 and the target contact force is minimized. With this, an optimal solution f of the grasping force of the gripper 1 required to follow $F_{des}$ is determined.

Figure 8:
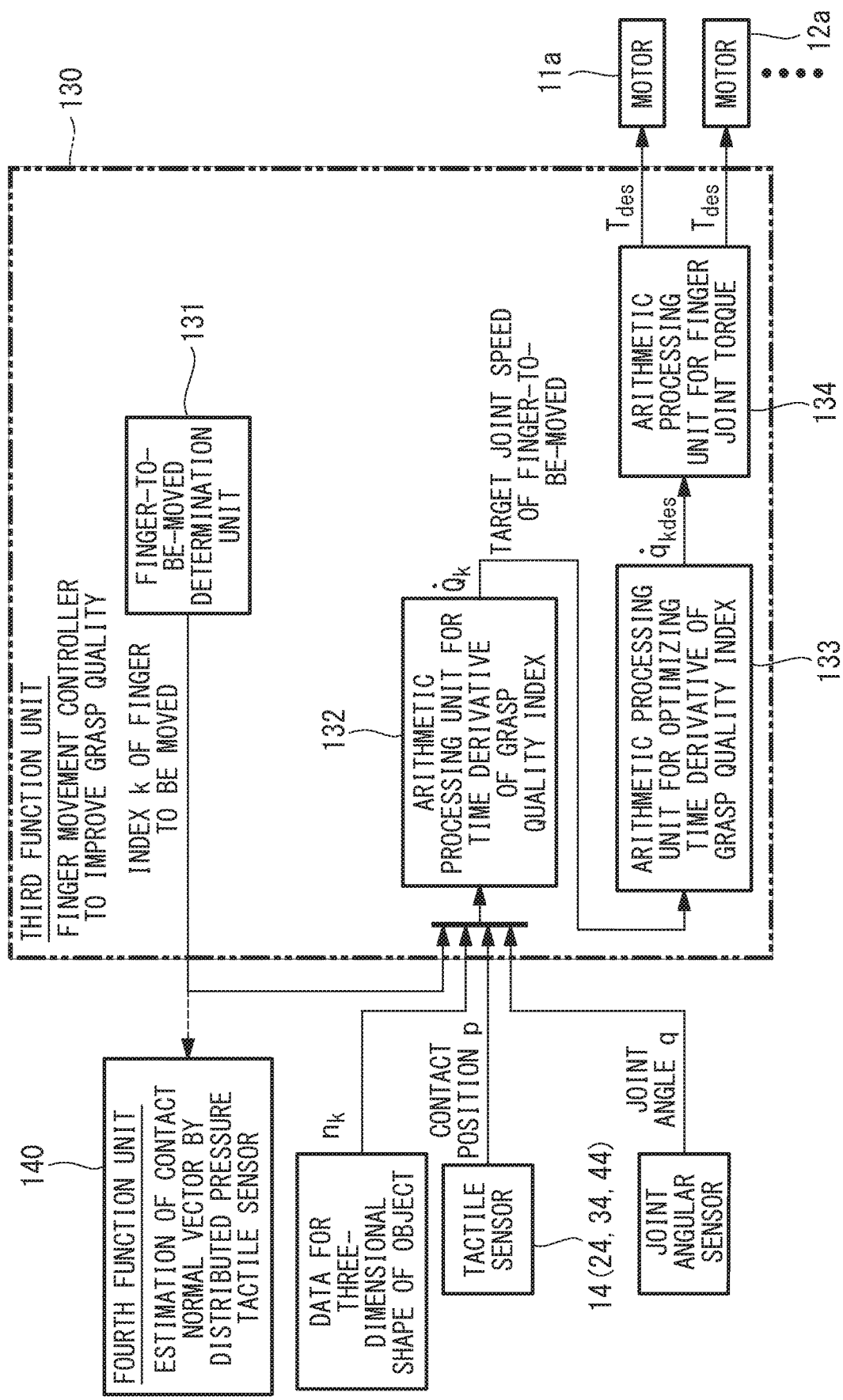
FIG. 8 is a functional block diagram illustrating a third function unit of the gripper control device due to the embodiment.

A functional block diagram of FIG. 8 shows an example of implementation of the third function unit 130.

The third function unit performs finger movement control which is carried out when the grasp quality evaluation value Q for the object O held by the fingers 10, 20, 30, and 40 is smaller than the threshold value $Q_{lim}$. A finger-to-be-moved determination unit 131 optimally selects a finger to be moved (finger-to-be-moved), and outputs the index k for the finger (a method for optimal selection will be described later). For example, the finger 10 is selected as a finger-to-be-moved.

Subsequently, using the data for the three-dimensional shape of the object O previously input into the control unit 60, a contact normal vector $n_{k1}$ (described later) between the object O and the finger 10 (determined as the finger-to-be-moved) is calculated, the current position p of the contact point detected by the tactile sensor 14 of the finger 10, and the current joint angle q detected by the angular sensor at each of the joints of the finger 10 are inputs, along with the index k, to an arithmetic processing unit 132 for time derivative of the grasp quality index, and time derivative $Q'_k$ of the grasp quality contribution degree for the finger 10 that is being moved (hereinafter, except for the expressions, a first time derivative is indicated by "'" for convenience) is calculated.

The calculated $Q'_k$ is an input to an arithmetic processing unit 133 for optimizing time derivative of the grasp quality index, a desired joint speed of the finger-to-be-moved 10 is determined by maximizing $Q'_k$, and as a result, $q'_{kdes}$ is calculated as an optimal solution. The calculated $q'_{kdes}$ is an input to an arithmetic processing unit 134 for the finger joint torque, and a desired joint torque $T_{kdes}$ required for realizing $q'_{kdes}$ is calculated. The calculated $T_{kdes}$ is provided for the motors 11a, 12a, and 13a of the finger 10, and the finger 10 is driven. As a result, the finger-to-be-moved 10 moves with a desired joint speed $q'_{kdes}$, and $Q_k$ is maximally increased as $Q'_k$ is maximized.

By moving the finger-to-be-moved 10 to a better contact position at which the grasp quality evaluation value Q is maximally increased, and bringing the finger 10 into contact with the object O at this position, the grasp quality of the object O increases, and the grasping condition changes from an unfavorable grasping state in which the grasp quality is below the threshold value $Q_{lim}$ to a grasping state with high grasp quality (grasp stability and grasp manipulability).

Next, an example of the method for optimal selection of the finger-to-be-moved will be described. First, one of the fingers 10, 20, 30, and 40 is temporarily selected. For example, the finger 10 is temporarily selected, and the grasp quality contribution degree $Q_{10}$ for the finger 10 is calculated. Then, the remaining fingers are also temporarily selected one by one, and the grasp quality contribution degrees of the corresponding fingers, for example, $Q_{20}$, $Q_{30}$, and $Q_{40}$ are respectively calculated, and the calculated grasp quality contribution degrees $Q_{10}$, $Q_{20}$, $Q_{30}$, and $Q_{40}$ are compared. However, the calculation of the grasp quality contribution degrees is carried out by a grasp quality evaluation section (first function unit), results of the calculation are sent to the finger-to-be-moved determination unit 131 of the third function unit, and the comparison of the calculation results and the determination of the finger-to-be-moved are carried out by the finger-to-be-moved determination unit 131.

The finger whose grasp quality contribution degree $Q_{10}$, $Q_{20}$, $Q_{30}$, or $Q_{40}$ is highest is considered as a finger with highest contribution to the grasp stability, with which most stable grasping state and can be realized, and is the farthest from the movement limitation of the joint (or a singular posture of the finger), and disposed at a position more easily to be controlled. Therefore, this finger is not determined to be a finger to be moved from the object O. On the other hand, the finger whose calculated $Q_{10}$, $Q_{20}$, $Q_{30}$, $Q_{40}$ is lowest is a finger with lowest contribution to the grasp stability, and is closest to the movement limitation of the joint (or the singular posture of the finger), and disposed at a position less easily to be controlled. Therefore, this finger is the best one to be moved, and is selected as the finger-to-be-moved. A finger whose calculated $Q_{10}$, $Q_{20}$, $Q_{30}$, or $Q_{40}$ is second or third smallest may also be selected as the finger-to-be-moved, if the value of the calculated $Q_{10}$, $Q_{20}$, $Q_{30}$, or $Q_{40}$ is smaller than, for example, the pre-determined threshold value.

The estimation of the contact normal vector nk1 by the fourth function unit 140 without instructing the data for the three-dimensional shape of the object to the control unit 60 will be described later. It should be noted that the finger movement operation is performed such that the finger speed of the finger 10 (a finger determined as the finger-to-be-moved) in a direction of a contact tangent line with respect to the object O is generated, and a finger joint target speed required to make a normal contact force in the direction of the contact normal vector with respect to the object O always be slightly larger than zero is calculated and converted into a target torque instruction to be supplied to the motors 11a, 12a, and 13a of the finger 10, and with this the finger 10 is moved. Therefore, the finger 10 moves along the surface of the object O. As a result, the finger that moves when controlling the movement of the finger will not be separated from the object O, and the grasping will not become unstable due to the reduced number of the contact points.

In the optimization problem, as in an expression (12), time derivative Q' for the grasp quality evaluation value is employed as an objective function and is to be maximized, and the linear optimization problem is solved to determine an optimal desired joint speed $q'_{kdes}$.

Expression 12

$$\max_{\dot{q}_k} \dot{Q} \quad (12)$$

There is an obvious option to employ the grasp quality evaluation value Q itself as the objective function. However, in this case, the grasp quality evaluation value Q is a function including a quadratic form of the joint angle $q_k$, and therefore a quadratic non-linear optimization problem needs to be solved, which increases processing time taken for calculation. Here, by taking the first time derivative, the time derivative Q' of a grasp quality evaluation value that does not include a quadratic form that is converted from the joint angle $q_k$ to the joint speed $q'_k$ is taken as an objective function. A method for moving the finger-to-be-moved by determining an optimal desired joint speed $q'_{kdes}$ with which the linear optimization problem for maximization the time derivative Q' is solved and can be realized in real-time.

Figure 9:
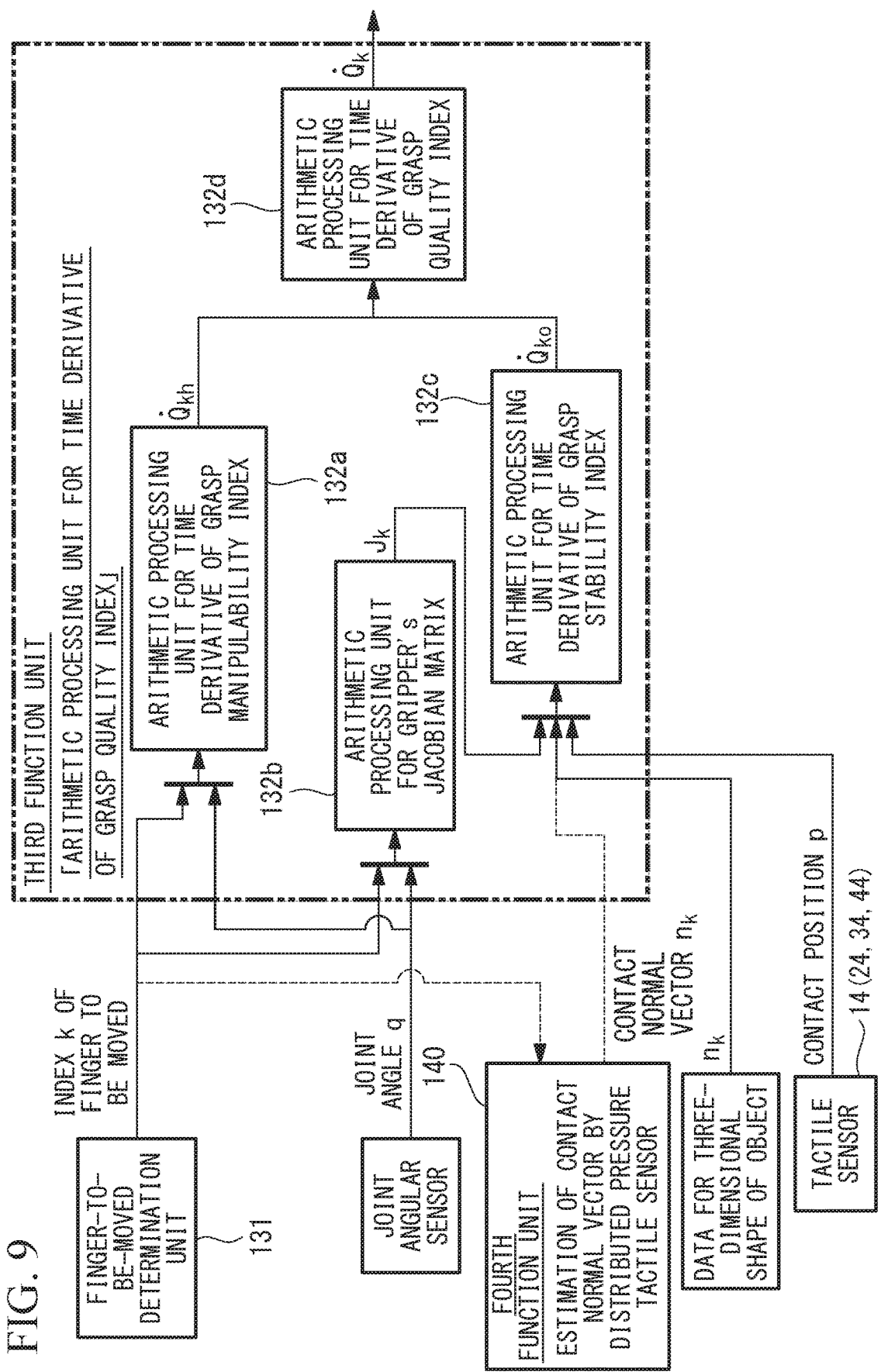
FIG. 9 is a subsidiary functional block diagram illustrating the third function unit of the gripper control device due to the embodiment.

A functional block diagram of FIG. 9 shows an example of implementation of the arithmetic processing unit for the time derivative of the grasp quality contribution degree of the third function unit 130 in more detail.

The index k of a finger to be moved determined by the finger-to-be-moved determination unit 131, for example, the index k=10 of the finger 10, is received, and the index k is an input, together with the joint angle q detected by the angular sensor at each of the joints of the finger 10, to an arithmetic processing unit 132a for the time derivative of the grasp manipulability index. The index k=10 is substituted in an expression (13) shown below, and time derivative $Q'_{kh}$ of the grasp manipulability contribution degree is calculated.

Expression 13

$$\dot{Q}_{hk} = -\sum_{i=1}^{N_{joint}} \left( \frac{\overline{q}_k^i - \overline{q}_k^i}{(q_{max,k}^i - q_{min,k}^i)^2} \dot{q}_k^i \right) \quad (13)$$

The finger index k and the detected joint angle q are input to an arithmetic processing unit 132b of the Gripper's Jacobian matrix, and Jacobian matrix $J_{10}$ of the finger-to-be-moved 10 is calculated. Further, using the data for the three-dimensional shape of the object O previously instructed to the control unit 60, a contact normal vector $n_k$ (described later) between the object O and the finger-to-be-moved 10 is calculated, as in an expression (14) shown below, the current position p of the contact point detected by the tactile sensor 14 of the moving finger 10, are inputs, along with the calculated Jacobian matrix $J_{10}$ of the finger-to-be-moved 10, to an arithmetic processing unit 132c for time derivative of the grasp stability index, and time derivative $Q'_{ko}$ of the grasp stability contribution degree for the finger-to-be-moved 10 is calculated.

Expression 14

$$\dot{Q}_o = \|p_2 - p_3\|_2 n_k^T v_s \quad (14)$$

The time derivative $Q'_{ko}$ and $Q'_{kh}$ of the calculated two grasp quality contribution degrees are input to a total amount calculation processing unit 132d for the time derivative of the grasp quality index, and the time derivative $Q'_k$ of the grasp quality contribution degree of the finger-to-be-moved 10 is obtained. The $Q'_k$ may also be calculated using an expression (15) shown below.

Expression 15

$$\dot{Q} = w_1 \|p_2 - p_3\|_2 n_k^T J \dot{q}_k + w_2 \sum_{i=1}^{N_{joint}} c_k^i \frac{\overline{q}_k^i - q_k^i}{(q_{max,k}^i - q_{min,k}^i)^2} \dot{q}_k^i \quad (15)$$

As one method of obtaining the contact normal vector $n_k$, the contact normal vector $n_k$ can be estimated by the fourth function unit 140 without instructing the data for the three-dimensional shape of the object O to the control unit 60. The fourth function unit will be described later. Further, the time derivative $Q'_k$ of the grasp quality contribution degree can be calculated as a linear combination of the time derivative $Q'_{ko}$ of the grasp stability contribution degree and the time derivative $Q'_{kh}$ of the grasp manipulability contribution degree. For example, these values can be calculated by accumulating operation respectively after multiplication of different weight coefficients.

Figure 10:
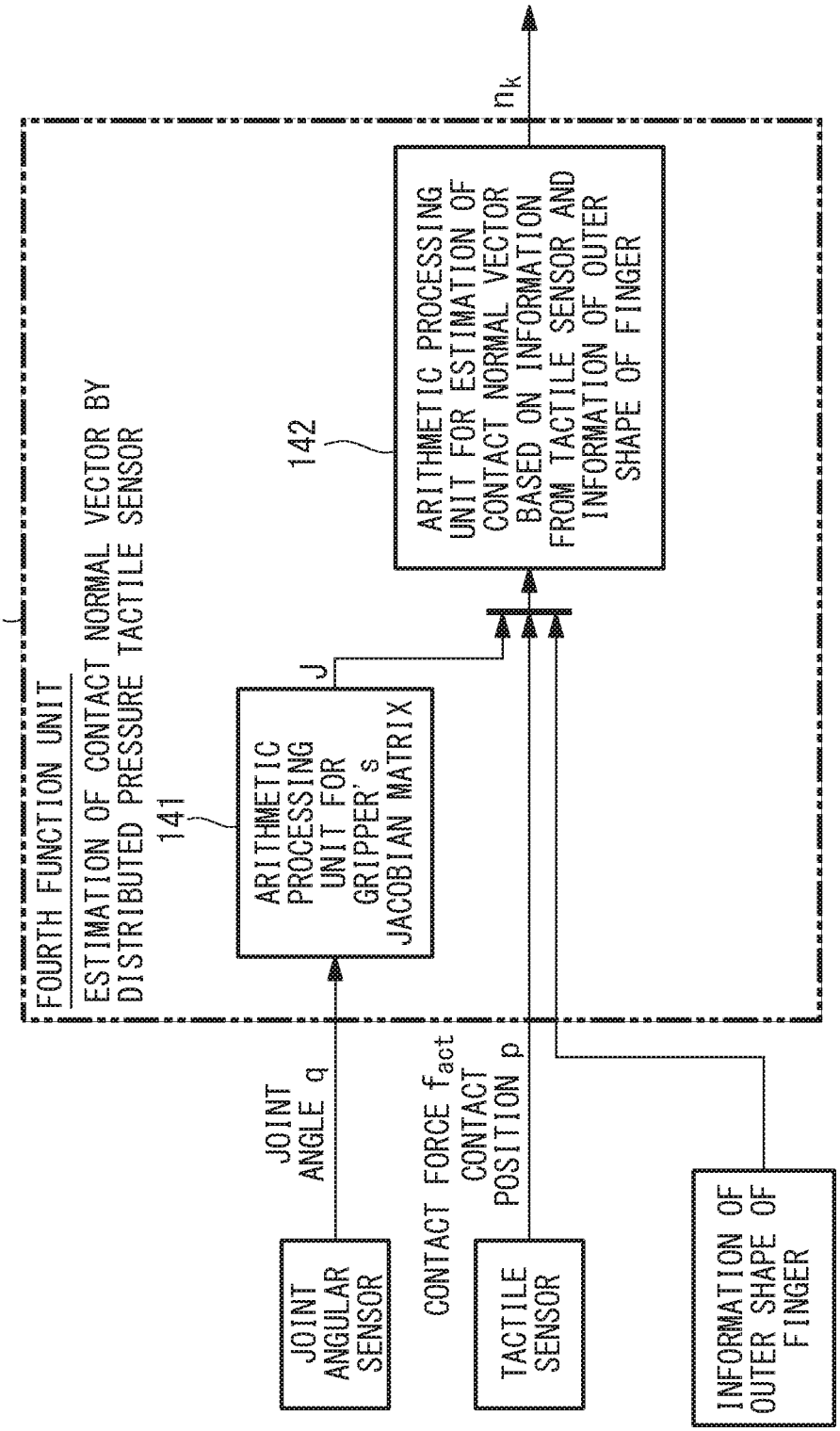
FIG. 10 is a functional block diagram illustrating a fourth function unit of the gripper control device due to the embodiment.

A functional block diagram of FIG. 10 shows an example of implementation of the fourth function unit 140.

The current joint angle q detected by the angular sensor of the finger joint is an input to an arithmetic processing unit 141 for the Gripper's Jacobian matrix, and the Gripper's Jacobian matrix J is calculated. The calculated J is an input, together with the current position p of and the current contact force $F_{act}$ at each of the contact points detected by the tactile sensors 14, 24, 34, and 44, or together with outer shape information of the fingers 10, 20, 30, and 40, to an arithmetic processing unit 142 for estimating contact normal vectors based on the information from the tactile sensors and the outer shape information of the finger, and contact normal vectors $n_{10}$, $n_{20}$, $n_{30}$, and $n_{40}$ between the object O and the fingers 10, 20, 30, and 40 are respectively calculated.

Figure 15:
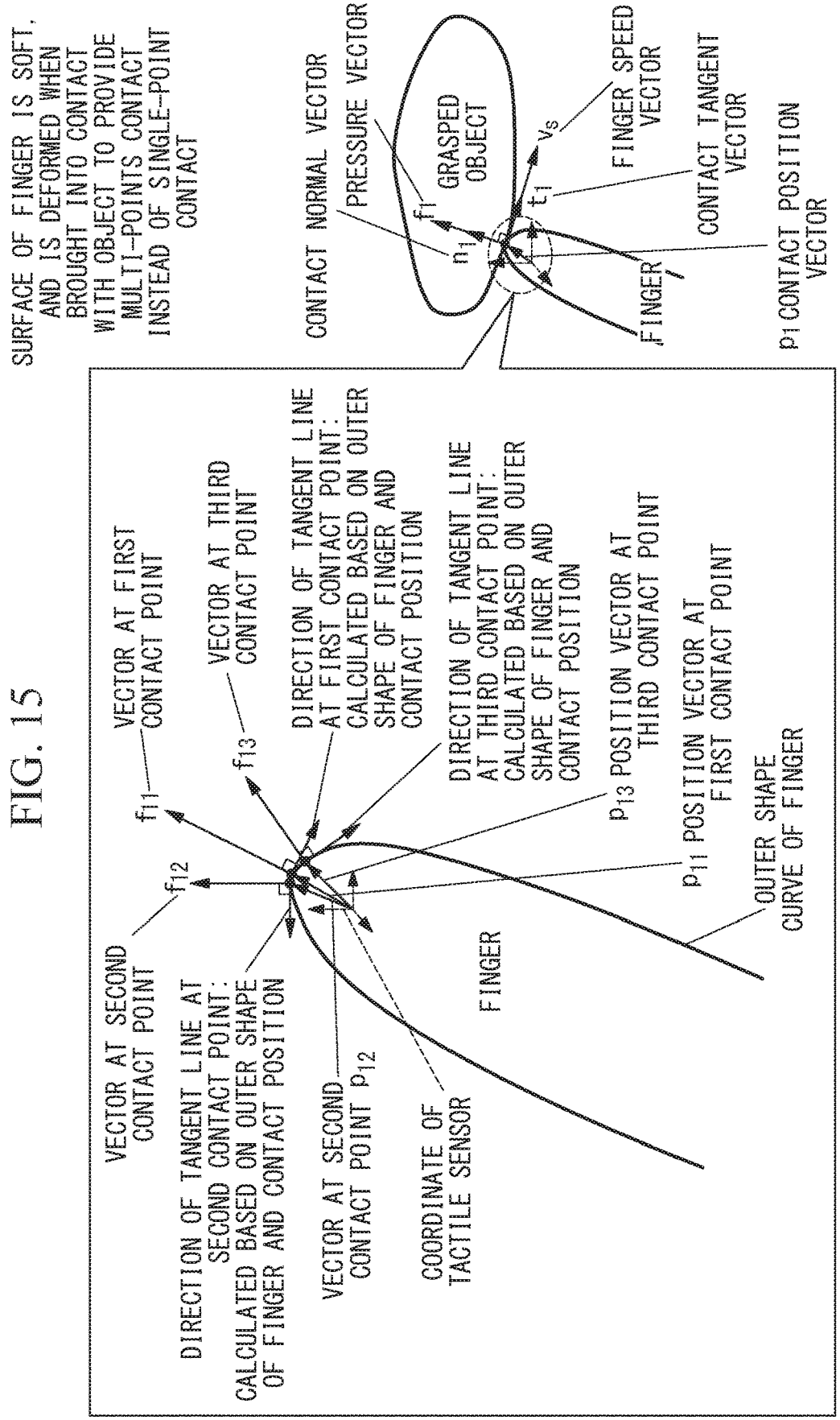
FIG. 15 is a diagram illustrating a method of estimating a contact normal vector in the fourth function unit of the gripper control device due to the embodiment.

A specific estimation method performed by the arithmetic processing unit 142 for estimating the contact normal vectors based on the information from the tactile sensors and the outer shape information of the fingers is shown in FIG. 15. While FIG. 15 shows a two-dimensional diagram which is easy to understand, this also can be applied to a three-dimensional estimation.

When the surface of the fingers and the surface of the object to be grasped are both soft, point contact does not actually exist due to contact surface deformation, and the surface deforms to some extent to make multi-points or a plane contact.

A case is described as an example, in which the distributed pressure tactile sensor 14 attached to the finger 10 detects three points at which a contact force has a value larger than zero: a contact force $f_{11}$ at the contact position $p_{11}$, a contact force $f_{12}$ at the contact position $p_{12}$, and a contact force $f_{13}$ at the contact position $p_{13}$. In this case, the contact position $p_{11}$, $p_{12}$, and $p_{13}$ are position vectors viewed from the origin in a coordinate system of the tactile sensor 14, and an average position vector $p_1$ is calculated as the contact position.

Further, directions of contact forces $f_{11}$, $f_{12}$, and $f_{13}$ are calculated using data of the outer shape of the finger 10, and in combination with a magnitude of the contact force detected by the tactile sensor 14, contact force vectors $f_{11}$, $f_{12}$, and $f_{13}$ are calculated to calculate an average contact force vector $f_1$ as the total contact force vector. A unit vector in a direction along the direction of the contact force vector is a contact normal vector $n_{10}$ desired to be obtained. The contact position is the calculated position vector $p_1$.

Here, this method is not limited to three-point contact, and effective in a case of multi-points (two or more points) contact. Further, when the surfaces of the fingers 10, 20, 30, and 40 are hard, or when the surface of the object to be grasped is hard, there is a case only one contact point exists. In this case, an average vector is not calculated, a contact position at a single point output from the tactile sensor 14 directly corresponds to $p_1$, and a magnitude of a contact force at the single point output from the tactile sensor 14 directly corresponds to $f_1$. Similarly to the above example, $n_{10}$ is calculated using the data of the outer shape of the finger 10, and the direction of $f_1$ becomes the same as the direction of $n_{10}$. With this, the contact normal vector $n_k$ may be estimated without any restriction to the number of the contact points. Here, it is also possible to provide a configuration, for example, in which a direction perpendicular to the estimated contact normal vector (i.e., the direction of the contact tangent line) is estimated to be a local surface shape of the object O, and by continuously estimating the contact normal vector, the finger-to-be-moved is moved in the direction of the contact tangent line while the finger-to-be-moved is prevented from being separated from the object O.

Figure 11:
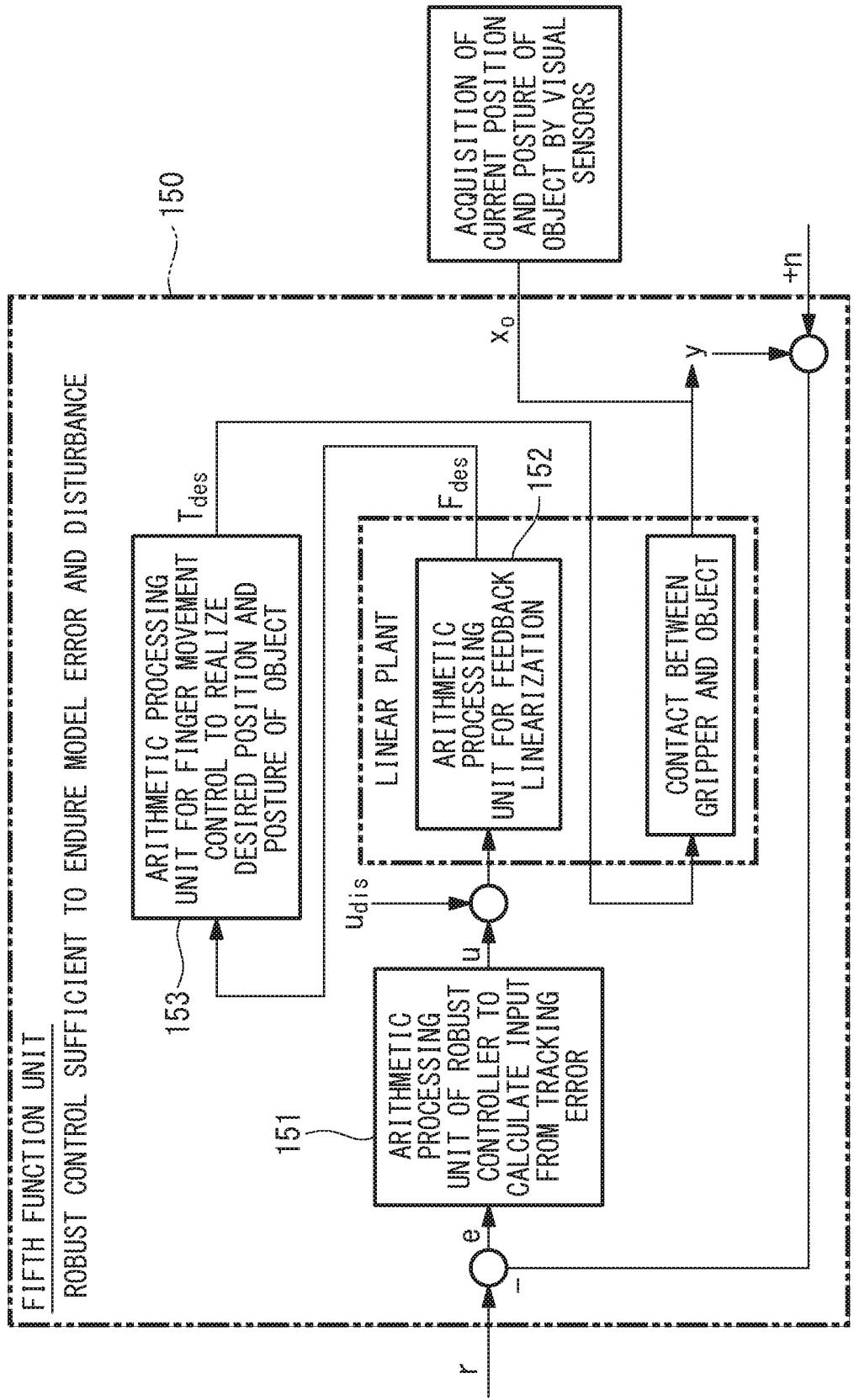
FIG. 11 is a functional block diagram illustrating a fifth function unit of the gripper control device due to the embodiment.

A functional block diagram of FIG. 11 shows an example of implementation of the fifth function unit 150.

The fifth function unit is a functional unit that is used in place of the second function unit (a manipulation controller for the movement of the object). When there is a model error of the gravity force, the shape, or the inertia of the object O, or when there is an unexpected external force, the fifth function unit takes a model error of the gravity force and the shape of the object and the external force as disturbance, and the inertia of the object O is considered as an uncertain factor, robust control is performed to drive the object O to follow the desired position and posture even under influences of these unexpected factors.

Based on information of the desired position and posture r of the object, and of an output y including a sensor noise n (e.g., when the current position and posture of the object O identified using the visual sensor), a tracking error e of the desired position and posture of the object O is calculated, the calculated tracking error e is an input to an arithmetic processing unit 151 for robust controller for calculating an input u, and the input u is calculated. A resulting input obtained by adding disturbance $u_{dis}$ to the calculated u is an input to an arithmetic processing unit 152 for feedback linearization, and a desired contact force $F_{des}$ at which feedback linearization is carried out is calculated.

The calculated desired contact force $F_{des}$ is an input to an arithmetic processing unit 153 for controlling the movement of the fingers to realize the desired position and posture of the object O, and the joint desired torque $T_{des}$ required to drive the object O to track the desired position and posture is calculate. By providing such a desired torque as a torque instruction from the fifth function unit 150 to the motor of each of the finger joints of the gripper 1, the gripper 1 moves and the contact between the fingers 10, 20, 30, and 40 of the gripper 1 and the object O occurs (or changes).

Under the contact forces generated by the movement of the fingers 10, 20, 30, and 40 of the gripper 1, the object O moves and its position and posture changes. The current position and posture of the object is obtained using information recognized by various sensors (e.g., three-dimensional visual sensors), and a result obtained by adding the sensor noise n to the current position and posture is fed back. With this, the tracking error e of the desired position and posture of the object O is updated to repeat robust control, and the object O is caused to track the desired position and posture even when there is disturbance or an uncertain factor.

The grasp stability evaluation value $Q_o$ may also be defined as follows. The grasp stability evaluation value $Q_o$ is defined by multiplying, by −1, a distance $d_1$ from a center of a polygon or polyhedron taking all of the contact positions (contact points) between the fingers and the object O as apices (for example, in a case of three-point contact, a triangle taking the three contact points as apices, and in a case of contact with four points that are not present in the same plane, a tetrahedron taking the four contact points as apices) to the gravity center of the object O. It is determined that the larger thus defined $Q_o$ is, the smaller positional misalignment between the center of the polygon or polyhedron and the gravity center of the object O is, and that the object O may not be easily dropped and the grasp stability is high.

As an example, there is described a method of calculating the grasp stability contribution degrees $Q_{o10}$, $Q_{o20}$, $Q_{o30}$, and $Q_{o40}$ of the fingers using the definition of the grasp stability evaluation value $Q_o$, when each of the fingers of a gripper having four fingers is in contact with the object O at one contact position. For example, the grasp stability contribution degree $Q_{o10}$ of the finger 10 is calculated by multiplying a distance $d_{10}$ from a center of a triangle taking the contact positions (contact point) of the remaining fingers 20, 30, and 40 while excluding the finger 10 as apices to the gravity center of the object O by −1 to obtain the grasp stability evaluation value $Q_{o10}$. There is a relation of $Q_{o10} = -d_{10}$. Similarly, there are relations of $Q_{o20} = -d_{20}$, $Q_{o30} = -d_{30}$, and $Q_{o40} = -d_{40}$. A finger corresponding to a minimum value out of $Q_{o10}$, $Q_{o20}$, $Q_{o30}$, and $Q_{o40}$ is taken as the finger-to-be-moved.

The grasp stability evaluation value $Q_o$ may also be defined as follows. The grasp stability evaluation value $Q_o$ is defined by multiplying, by −1, a distance $d_2$ from the center of the minimum convex hull containing all of the force cones and the moment cones at the corresponding contact position out of multiple contact positions between the fingers and the object to the gravity center of the object O. It is determined that the larger thus defined $Q_o$ is, the smaller positional misalignment between the center of the minimum convex hull and the gravity center of the object O, and that the object O may not be easily dropped and the grasp stability is high.

As an example, there is described a method of calculating the grasp stability contribution degrees $Q_{o10}$, $Q_{o20}$, $Q_{o30}$, and $Q_{o40}$ of the fingers using the definition of the grasp stability evaluation value $Q_o$, when each of the fingers of a gripper having four fingers is in contact with the object O at one contact position. For example, the grasp stability contribution degree $Q_{o10}$ of the finger 10 is calculated by taking a distance $d_{102}$ from a center of the minimum convex hull containing all of the force cones and the moment cones at each of the contact positions of the remaining fingers 20, 30, and 40 while excluding the finger 10 to the gravity center of the object O as the grasp stability evaluation value $Q_{o10}$. There is a relation of $Q_{o10} = d_{102}$. Similarly, there are relations of $Q_{o20} = d_{202}$, $Q_{o30} = d_{302}$, and $Q_{o40} = d_{402}$. A finger corresponding to a minimum value out of $Q_{o10}$, $Q_{o20}$, $Q_{o30}$, and $Q_{o40}$ is taken as the finger-to-be-moved.

According to this embodiment, the arithmetic processing unit 111 for the grasp stability index, the arithmetic processing unit 112 for the grasp manipulability index, and the total amount calculation processing unit 113 for the grasp quality serve as the grasp quality evaluation section. And among these, the arithmetic processing unit 112 for the grasp manipulability index serves as a grasp manipulability evaluation section, the finger-to-be-moved determination unit 131 serves as a finger-to-be-moved determination section, and the second function unit 120, the third function unit 130, and the fifth function unit serve as a finger movement control section. The object detection section detects the position and posture of the object O using the detected result of the visual sensor 45. The following description is based on such correspondence relations.

This embodiment provides a gripper control device for controlling a gripper 1 that grasps an object O with multiple fingers, the device including: a grasp quality evaluation section configured to obtain a grasp quality contribution degree for each contact positions at which a part of multiple fingers that support the object O are in contact with the object, the grasp quality contribution degree indicating contribution to grasp stability of the object O; a finger-to-be-moved determination section configured to determine, as a finger-to-be-moved, one of the fingers corresponding to one of the contact positions at which the grasp quality contribution degree is low; and a finger movement control section configured to send a control command to motors as a finger driving section, the control command being an instruction for moving the finger determined as the finger-to-be-moved with respect to the object, wherein the grasp quality contribution degree for each of multiple contact positions is defined using at least one of the following elements: a relative location between the object O and each contact positions; and a friction coefficient between the object O and the fingers at the each contact position.

Here, "a plurality of contact positions at which a part of multiple fingers that support the object O are in contact with the object" refers to four contact positions at which four fingers are in contact with the object O in a case in which the gripper 1 includes five fingers, four of these fingers are in contact with the object O to hold the object O, and the remaining one finger is not used to hold the object O.

Further, "to determine, as a finger-to-be-moved, one of the fingers corresponding to one of the contact positions at which the grasp quality contribution degree is low" includes a case in which two fingers corresponding to two contact positions whose grasp quality contribution degrees are low are determined as the fingers-to-be-moved where five fingers are used, in addition to a case in which one finger corresponding to one contact position whose grasp quality contribution degree is low is determined as the finger-to-be-moved.

According to this configuration, by introducing the grasp quality contribution degree for each of multiple contact positions, and by determining a finger corresponding to a contact position whose grasp quality contribution degree is low as the finger-to-be-moved, a finger corresponding to a contact position whose contribution to the grasp stability is low and can be changed is determined as the finger-to-be-moved. When the grasp quality contribution degree $Q_{10}$ of the finger-to-be-moved (e.g., the finger 10) is lower than the grasp quality contribution degrees $Q_{20}$, $Q_{30}$, and $Q_{40}$ of other fingers, even when the finger-to-be-moved 10 is removed from the object O, or when the contact force of the finger-to-be-moved 10 supplied to the object O decreases, it is less likely to drop the object due to a considerable decrease in the grasp stability of the object O. Further, by moving the finger-to-be-moved 10, for example, to a contact position at which the grasp quality contribution degree $Q_{10}$ increases, it is possible to improve the grasp stability of the object O.

According to this embodiment, the grasp quality evaluation section is configured to obtain a grasp quality evaluation value Q indicating quantitative evaluation of the grasp stability of the object O with multiple fingers corresponding to multiple contact positions, the finger-to-be-moved determination section is configured to determine, as the finger-to-be-moved, one of the fingers corresponding to one of the contact positions at which the grasp quality contribution degree is low, when the grasp quality evaluation value Q is lower than a predetermined threshold value $Q_{lim}$, finger movement control by the finger movement control section is configured to be executed when the grasp quality evaluation value Q is lower than the threshold value $Q_{lim}$, and the grasp quality evaluation value Q is defined using at least one of the following elements: relative locations between the object O and multiple contact positions; and the friction coefficients between the object and the fingers respectively at multiple contact positions.

According to this configuration, the determination of the finger-to-be-moved is performed and the finger is moved, only when the grasp quality evaluation value Q quantitatively representing the grasp stability of the object O is smaller than the pre-determined threshold value $Q_{lim}$, it is possible to prevent the grasp stability of the object O from decreasing due to unnecessary movement of the finger.

According to this embodiment, the finger movement control section is configured to perform optimization problem processing to obtain a target value for one of a driving amount and a driving speed of the driving section, and the optimization problem processing obtains the target value for causing the finger determined as the finger-to-be-moved to be moved in a direction toward which the grasp quality evaluation value Q increases.

Further, according to the configuration of this embodiment, the optimization problem processing obtains the target value for the driving speed of a motor driving a joint of the finger determined as the finger-to-be-moved, by which target value an objective function is maximized, the objective function being a first time derivative Q' of the grasp quality evaluation value Q.

Maximizing the grasp quality evaluation value Q itself as an objective function in order to increase the grasp quality evaluation value Q results in solving a quadratic non-linear optimization problem, and increases time required for calculation processing. However, by maximizing the first time derivative Q' of the grasp quality evaluation value Q as an objective function, it is possible to solve a linear optimization problem that does not include a quadratic form. Therefore, the time required for calculation processing is reduced, and this is extremely useful in optimal determination of a target value for the joint speed of the finger-to-be-moved in real-time in order to increase the grasp quality evaluation value Q. Further, by maximizing the first time derivative Q' of the grasp quality evaluation value Q, an increased amount of the grasp quality evaluation value Q is maximized. As a result, as the grasp quality evaluation value Q is maximally increased, the same effect as maximization of the grasp quality evaluation value Q itself may be obtained.

According to this embodiment, the grasp quality evaluation value Q and the grasp quality contribution degrees $Q_{10}$, $Q_{20}$, $Q_{30}$, and $Q_{40}$ for the respective contact positions are defined using contact forces respectively generated at multiple contact positions.

According to this embodiment, the finger movement control section sends, to the driving section, the control command for causing the finger determined as the finger-to-be-moved to move along a surface of the object O while the finger is kept in contact with the object O.

If a part of the fingers is separated from the object O, moved, and again brought into contact with the object O when the repositioning operation of the object is carried out, there is a possibility that, at the moment when this finger is removed from the object O, the object O may be dropped, failing to stably grasp the object O with the remaining fingers. The less the total number of the fingers is, the higher the possibility is. The present invention reduces or eliminates this possibility by providing a control law such that the finger-to-be-moved is moved along the surface of the object while being kept in touch with the object.

In this configuration, when the finger-to-be-moved is moved in order to improve the grasp stability, the finger is moved so as not to be separated from the surface of the object O. For example, the finger is moved with a target joint speed that generates a finger speed in a direction of the contact tangent line of the object O, while a normal contact force slightly greater than zero is applied to the object O. Therefore, it is possible to avoid a situation in which the object O is dropped once the contact with the object O is lost.

According to this embodiment, when four contact positions are provided, the grasp quality evaluation section is configured to define, for each of the contact positions, a point obtained by projecting the corresponding contact position on a plane including the contact positions other than the corresponding contact position, and configured to obtain one of an area of a quadrangle as the grasp quality contribution degree of the corresponding contact position and a minimum value of the area of the quadrangle as the grasp quality evaluation value Q, the quadrangle being defined by the contact positions other than the corresponding contact position and the point, the finger-to-be-moved determination section is configured to determine that the grasp quality contribution degree for one of the contact position whose area of the quadrangle is small is low.

According to this configuration, the grasp quality evaluation value and the grasp quality contribution degrees for the contact positions may be obtained, for example, only based on the relative positions of multiple contact positions, it is extremely useful in real-time calculation of the grasp quality evaluation value and the grasp quality contribution degree for each of the contact positions.

According to this embodiment, the grasp quality evaluation section is configured to obtain a force cone for each of the multiple contact positions, the force cone including a set of vectors of contact forces that will not cause the fingers to slip at the corresponding contact positions, and obtain the grasp quality contribution degree for the each of multiple contact positions using the obtained force cone.

Further, according to this embodiment, the grasp quality evaluation section is configured to obtain a force cone for each of multiple contact positions, the force cone including a set of vectors of contact forces that will not cause the fingers to slip at the corresponding contact positions, and obtain the grasp quality evaluation value using the obtained force cone.

According to this configuration, the force cone includes the set of vectors of contact forces that will not cause the finger to slip at the corresponding contact positions, and it is possible to specify a contact position whose grasp quality contribution degree is low based on the force cones of the multiple contact positions. Further, as the contribution is determined considering a force and a friction coefficient at each contact position in the grasp stability evaluation, it is useful to improve accuracy in the specification based on the determination result. Further, such a configuration is versatile as the specification based on the determination result of the grasp quality contribution degree is possible regardless of the number of the contact points between the gripper 1 and the object O.

According to this embodiment, the grasp quality evaluation section is configured to obtain a moment cone for each of the multiple contact positions, the moment cone including a set of moments around the gravity center of the object generated from a set of contact forces that will not cause the fingers to slip at the corresponding contact positions, and obtain the grasp quality evaluation value or the grasp quality contribution degree for the each of multiple contact positions using the obtained moment cone.

Further, according to this embodiment, the grasp quality evaluation section is configured to obtain a moment cone, the moment cone including a set of moments around the gravity center of the object O generated from a set of contact forces that will not cause the fingers to slip, and obtain the grasp quality evaluation value using the obtained moment cone.

According to this configuration, the moment cone includes the set of moments around the gravity center of the object generated from the contact forces that will not cause the finger to slip at the corresponding contact positions, and it is possible to specify a contact position whose grasp quality contribution degree is low based on the moment cones of the multiple contact positions. Further, as the contribution is determined considering a force, a moment, and a friction coefficient at each contact position in the grasp stability evaluation, it is useful to improve accuracy in the specification based on the determination result. Further, such a configuration is versatile as the specification based on the determination result of the grasp quality contribution degree is possible regardless of the number of the contact points between the gripper 1 and the object O.

According to this embodiment, the grasp quality evaluation section is configured to obtain the grasp quality contribution degree for each of the contact positions, using at least one of the force cone and the moment cone of the contact positions other than the corresponding contact position.

As the contact positions other than this contact position are contact positions at which the contact between the object O and the fingers that are mot moved when the finger-to-be-moved is moved is maintained, the grasp quality contribution degree thus obtained allows estimation of the grasp stability of the object O after the finger at this contact position is removed, or after the contact force of the finger at this contact position decreases. By employing the grasp quality contribution degree defined from such an aspect, it is possible to specify the finger-to-be-moved more accurately, and it is extremely useful to maximally improve the grasp stability of the object O.

According to this embodiment, the grasp quality evaluation section is configured to obtain a moment cone for each of the multiple contact positions, the moment cone including a set of moments around the gravity center of the object generated from a set of contact forces that will not cause the fingers to slip at the corresponding contact positions, and the grasp quality evaluation section is further configured to define, for each of the contact positions, a minimum convex hull including all of the force cones and the moment cones for the contact positions other than the corresponding contact position, and obtain the grasp quality contribution degree of the corresponding contact position using at least one of a volume of the convex hull and a shortest distance between a boundary of the convex hull and the gravity center G of the object O.

As the contact positions other than this contact position are contact positions that are unchanged and not influenced by the movement control of the finger-to-be-moved, the grasp quality contribution degree thus defined using the minimum convex hull allows estimation of the grasp stability of the object O after the finger at this contact position is removed, or after the contact force of the finger at this contact position decreases. By employing the grasp quality contribution degree defined from such an aspect, it is possible to specify the finger-to-be-moved more accurately, and it is extremely useful to maximally improve the grasp stability of the object O.

According to this embodiment, there is provided a grasp manipulability evaluation section configured to obtain, for each of the fingers, a grasp manipulability evaluation value indicating one of a movable range of the corresponding finger and a current position of the corresponding finger with respect to a particular posture of the fingers with which posture a finger speed fails to be gathered, wherein the grasp quality evaluation section is configured to obtain one of the grasp quality contribution degree and the grasp quality evaluation value using the grasp manipulability evaluation value for each of the fingers.

By introducing the grasp manipulability evaluation value, in addition to whether or not the object O is stably grasped and may not easily dropped, it is possible to evaluate quantitatively whether or not, while the finger manipulates the object O to the desired position and posture, the finger is close to a position at or a singular posture with which the object O cannot be manipulated, due to a restriction of the mechanical structure of each of the fingers (that each joint has a movable range and may not rotate limitlessly in either direction, or that a singular posture of the finger structurally exists).

For example, when the grasp manipulability evaluation value is maximized, the finger joint will move back to its central position of the movable range before it reaches its movement limitation, the finger is not restricted by the joint movement limit or the presence of the singular posture of this finger, and it is possible to prevent a disadvantageous situation that when the object O is manipulated to the desired position and posture, the finger reaches the movement limit or the singular posture and gets stuck in this position, and the desired position and posture of the object O cannot be realized, or even the motor of the joint is oscillated at this position.

According to this embodiment, there is provided an object detection section configured to detect a position and a posture of the object O, wherein each of the fingers includes a distributed pressure sensor, and a computer is configured to detect relative positions of the multiple contact positions with respect to the object, based on detected results by the distributed pressure sensor and detected results by the object detecting section.

According to this configuration, it is possible to eliminate necessity of instruction of the three-dimensional shape of the object O in order to obtain the relative positions of the multiple contact positions with respect to the object O, provide high adaptability in grasping of the object O of various types, eliminate time required for instruction to reduced overall operating time, and provide advantageous effects in improving work efficiency and manipulability.

According to this embodiment, each of the fingers is equipped with a distributed pressure sensor, and a computer is configured to estimate, for each of the fingers, a direction of a contact normal vector with the object O at each of the contact positions, based on detected results by the distributed pressure sensor.

According to this configuration, it is possible to eliminate necessity of instruction of the three-dimensional shape of the object O in order to obtain the direction of the contact normal vector at each multiple contact position, provide high adaptability in grasping of the object O of various types, eliminate time required for instruction to reduced overall operating time, and provide advantageous effects in improving work efficiency and manipulability.

According to this embodiment, there is provided an object shape estimation section configured to estimate a surface shape of the object O at the contact positions based on the detected results by the distributed pressure sensors.

According to this configuration, it is possible to eliminate necessity of instruction of the three-dimensional shape of the object O in order to estimate the surface shape of the object O to be grasped, provide high adaptability in grasping of the object O of various types, eliminate time required for instruction to reduced overall operating time, and provide advantageous effects in improving work efficiency and manipulability.

According to this embodiment, the finger movement control section is configured to send, to the driving section, the control command for causing the determined finger-to-be-moved to move along the surface of the object O such that the finger keeps in contact with the object O based on the surface shape estimated by the object shape estimation section.

In this case, it is possible to eliminate necessity of instruction of the three-dimensional shape of the object O in order to move the finger-to-be-moved along the surface of the object O, provide high adaptability in grasping of the object O of various types, eliminate time required for instruction to reduced overall operating time, and provide advantageous effects in improving work efficiency and manipulability.

According to this embodiment, the finger movement control section is configured to send, to the driving section, a control command for causing a position and a posture of the object O with respect to the gripper 1 to track a desired value while a gravity force and an inertial force applied on the object O are compensated.

In a case of the grasp posture in which the gravity force of the object is in a direction in which the object may be easily dropped, or in a case in which the object is moved upon an unexpected external force, and an inertial force of the object becomes unignorably, the object O may be adversely dropped if the repositioning operation is carried out without compensating the gravity force and the inertial force of the object. Further, when the repositioning operation is carried out without considering dynamics of the object O, it is not possible to perform tracking control to the specified desired position and posture, and the object O may adversely not be manipulated to the specified desired position and posture of the object O.

In the above configuration, the dynamics and the gravity force of the object O are considered, and the inertial force and the gravity force of the object O are always compensated.

According to this embodiment, the finger movement control section is configured to generate a control command for causing a position and a posture of the object O with respect to the gripper 1 to track a desired value based on a robust control method, taking a model error of inertia of the object O as an uncertain factor, and taking estimation errors of the gravity force and the shape of the object O as well as an unexpected external force applied to the object O as disturbance.

There is a case in which various problems may be posed which hinders intended control while a control technique for the repositioning operation (in-hand manipulation) of the object O by the gripper 1 is put into practice. For example, when a box of apples of similar weights and shapes are to be grasped using the same gripper 1, gravity forces, shapes, and inertia of these apples are slightly varied, and each apple may not be moved as intended by the control law due to such model errors. Further, in a case in which various types of the object O are stacked and when one of the objects O is picked, if an adjacent object falls down and cause an impact force executed on the target object O that we are trying to pick up, the object O to be picked may adversely not be moved to the desired position and posture of the object O as an unexpected external force is applied during movement control.

In the above configuration, by performing robust control to enable manipulation of the object O to the desired position and posture even when such a model error or an unexpected external force exists, and thus it is possible to eliminate problems that can be posed in practical implementation.

It should be noted that in all of the above description regarding the gripper control device according to this embodiment, the operations that are performed by or can be performed by the grasp quality evaluation section, the finger-to-be-moved determination section, the finger movement control section, the grasp manipulability evaluation section, the object detection section, and the object shape estimation section can be processed or executed using a computer. In other words, all of the gripper control devices according to this embodiment described above can be defined as a method for executing processes that are performed or can be performed by these sections.

Further, all of the gripper control devices according to this embodiment described above can perform simulation of processes that are performed or can be performed by these sections of all of the gripper control devices according to this embodiment, assuming that a model of a gripper set to a simulation device is the gripper 1 according to this embodiment, for example. Specifically, all of the gripper control devices according to this embodiment described above can be defined as a simulation device for executing processes that are performed or can be performed by these sections.

Further, the gripper (gripper device) 1 including the gripper control device may also provide all of the actions and effects of all of the gripper control devices according to this embodiment, and a robot provided with the gripper 1 may also provide all of the actions and effects of all of the gripper control devices according to this embodiment.

Conventionally, in order to put an object to be grasped into a desired position and posture, the object that is grasped is temporarily placed on a table, and then the object is grasped again to change position and posture of the object related to the gripper to desired values. However, this poses various problems such that a hinderance to a high speed operation, increased cost and time in designing and manufacturing the temporary table, and necessity for instruction of temporary placement. By performing the in-gripper manipulation control according to this embodiment, it is possible to realize a high speed operation, reduced work time and reduced costs, minimized steps for instruction, and thus contributes to improvement of productivity in industry.

The following aspects of the invention are derived from the aforementioned embodiments.

A first aspect of the present invention provides a gripper control device for controlling a gripper that grasps an object with a plurality of fingers, the gripper control device including: a grasp quality evaluation process to obtain a grasp quality contribution degree for each of a plurality of contact positions at which multiple fingers that support the object are in contact with the object, the grasp quality contribution degree indicating contribution degree to grasp stability of the object; a finger-to-be-moved determination process to determine, as a finger-to-be-moved, at least one of the fingers corresponding to at least one of the contact positions at which the grasp quality contribution degree is low; and a finger movement control process to send a control command to a finger driving apparatus, the control command being one for moving the determined finger-to-be-moved with respect to the object, wherein the grasp quality contribution degree for each of multiple contact position is defined using at least one of the following elements: relative locations of the plurality of contact positions related to the object; and friction coefficients between the object and the fingers respectively at the plurality of contact positions.

According to this aspect, by introducing the grasp quality contribution degree for each of the plurality of contact positions, and by determining a finger corresponding to a contact position whose grasp quality contribution degree is low as the finger-to-be-moved, a finger corresponding to a contact position whose contribution degree to the grasp stability is low and thus can be changed is determined as the finger-to-be-moved. Since the grasp quality contribution degree of the finger-to-be-moved is lower than the grasp quality contribution degrees of other fingers, even when the finger-to-be-moved is removed from the object, or when the contact force of the finger-to-be-moved supplied to the object decreases, it is less likely to drop the object due to a considerable decrease in the grasp stability of the object. Further, by moving the finger-to-be-moved, for example, to a new desired contact position at which the grasp quality contribution degree increases, it is possible to improve the grasp stability of the object.

According to the aspect described above, preferably, the grasp quality evaluation process is configured to obtain a grasp quality evaluation value indicating quantitative evaluation of the grasp stability of the object with multiple fingers corresponding to multiple contact positions, the finger-to-be-moved determination process is configured to determine, as the finger-to-be-moved, the at least one of the fingers corresponding to the at least one of the contact positions at which the grasp quality contribution degree is low; when the grasp quality evaluation value is lower than a pre-determined threshold value, finger movement control by the finger movement control process is executed when the grasp quality evaluation value is lower than the threshold value, and the grasp quality evaluation value is defined using at least one of the following elements: relative locations of the plurality of contact positions related to the object; and friction coefficients between the object and the fingers respectively at the plurality of contact positions.

According to this configuration, the determination of the finger-to-be-moved is performed and the determined finger is moved, only when the grasp quality evaluation value quantitatively representing the grasp stability of the object is lower than the pre-determined threshold value, in order to prevent the grasp stability of the object from decreasing due to unnecessary finger movement.

According to the aspect described above, preferably, the finger movement control process is configured to perform optimization problem solving processing to obtain a target value for either a driving amount or a driving speed of the finger driving apparatus, and the optimization problem solving processing obtains the target value for making the determined finger-to-be-moved move in a direction toward which the grasp quality evaluation value increases.

Further, according to the aspect described above, it is preferable that the optimization problem solving processing obtains the target value for the driving speed of a motor which drives a joint of the determined finger-to-be-moved so that the target value maximize an objective function, which being a first time derivative of the grasp quality evaluation value.

Choosing the grasp quality evaluation value itself as an objective function to be maximized in order to increase the grasp quality evaluation value results in solving a quadratic non-linear optimization problem, and consumes too much time for calculation processing. However, by choosing the first time derivative of the grasp quality evaluation value as an objective function to be maximized, we only need to solve a linear optimization problem that does not contain a quadratic form. Therefore, the time required for calculation processing is reduced, and this is extremely useful in optimal determination of a target value for the joint speed of the finger-to-be-moved in real-time in order to increase the grasp quality evaluation value. Further, by maximizing the first time derivative of the grasp quality evaluation value, an increased amount of the grasp quality evaluation value has been maximized. As a result, as the grasp quality evaluation value increased maximally, the same effect as maximization of the grasp quality evaluation value itself can be obtained.

With this, it is possible to solve the problem that cannot be solved by Japanese Patent No. 6057862, that is, the problem that an amount of calculation is large and real-time implementation is difficult as a series of complicated motion plans and state transitions are carried out. In other words, this technique is highly useful in industry where improvements in control speed, productivity, and manipulability are always demanded.

According to the aspect described above, preferably, the grasp quality evaluation value and the grasp quality contribution degree for each contact position is defined using a contact force generated at each contact position.

According to the aspect described above, the finger movement control process can send, to the driving apparatus, the control command which makes the determined finger-to-be-moved move on a surface of the object while keeping the finger always contacting with the object.

In Japanese Patent No. 4890199, as a part of the fingers is separated from the object, moved, and again brought into contact with the object when the repositioning operation of the object is carried out, there is a risk that, at the moment when this finger is removed from the object, the object may be dropped, failing to grasp the object stably with the remaining fingers. The less the total number of the fingers is, the higher the risk is. The present invention reduces or eliminates this risk by providing a control law such that the finger-to-be-moved is moved along the surface of the object while being kept in touch with the object without separating.

According to this configuration, when the finger-to-be-moved is moved in order to improve the grasp stability, the finger is moved without being separated from the surface of the object. For example, the finger is moved with a target joint speed that generates a finger speed in a direction of the contact tangent line of the object, together with a normal contact force slightly larger than zero is applied to the object. Therefore, it is possible to avoid a situation in which the object is dropped once the contact with the object is lost.

According to the aspect described above, preferably, when four contact positions exist, the grasp quality evaluation process is configured to define, for each contact position, a point obtained by projecting the corresponding contact position on a plane which is defined by the three remaining contact positions to obtain an area of a quadrangle as the grasp quality contribution degree of the corresponding contact position, or to obtain a minimum value of the areas of the quadrangles regarding respective contact positions as the grasp quality evaluation value, the quadrangle here being defined by the remaining contact positions while excluding the corresponding contact positions, the finger-to-be-moved determination process is configured to determine that the grasp quality contribution degree for one of the contact positions whose area of the quadrangle is smallest is lowest.

According to this configuration, the grasp quality evaluation value and the grasp quality contribution degrees for the contact positions can be calculated, for example, only based on the relative positions of the plurality of contact positions, it is extremely useful in real-time calculation of the grasp quality evaluation value and the grasp quality contribution degree for each contact position.

According to the aspect described above, preferably, the grasp quality evaluation section is configured to obtain a force cone for each of the plurality of contact positions, the force cone including a set of vectors of contact forces that do not cause the fingers to slip at the corresponding contact positions, and obtain the grasp quality contribution degree for each of the plurality of contact positions using the obtained force cone.

According to the aspect described above, preferably, the grasp quality evaluation process is configured to obtain a force cone for each of the plurality of contact positions, the force cone including a set of vectors of contact forces that do not cause the fingers to slip at the corresponding contact positions, and obtain the grasp quality evaluation value using the obtained force cone.

According to this configuration, the force cone includes the set of vectors of contact forces that do not cause the finger to slip at the corresponding contact positions, and it is possible to specify a contact position whose grasp quality contribution degree is low based on the force cones of the multiple contact positions. Further, as the contribution is determined considering a force and a friction coefficient at each contact position in the grasp stability evaluation, it is useful to improve accuracy in the specification based on the determination result. Further, such a configuration is versatile as the specification based on the determination result of the grasp quality contribution degree is possible regardless of the number of the contact points between the gripper and the object.

According to the aspect described above, preferably, the grasp quality evaluation process is configured to obtain a moment cone for each of the plurality of contact positions, the moment cone including a set of moments around the gravity center of the object generated by a set of contact forces that do not cause the fingers to slip at the corresponding contact positions, and obtain the grasp quality contribution degree for each of the plurality of contact positions using the obtained moment cone.

According to the aspect described above, preferably, the grasp quality evaluation process is configured to obtain a moment cone for each of the plurality of contact positions, the moment cone including a set of moments around the gravity center of the object generated by a set of contact forces that do not cause the fingers to slip at the corresponding contact positions, and obtain the grasp quality evaluation value using the obtained moment cone.

According to this configuration, the moment cone includes the set of moments around the gravity center of the object generated from the contact forces that do not cause the finger to slip at the corresponding contact positions, and it is possible to specify a contact position whose grasp quality contribution degree is low based on the moment cones of the multiple contact positions. Further, as the contribution is determined while considering a contact force, a moment generated by this force, and a friction coefficient at each contact position in the grasp stability evaluation, it is useful to improve accuracy in the specification based on the determination result. Further, such a configuration is versatile as the specification based on the determination result of the grasp quality contribution degree is possible regardless of the number of the contact points between the gripper and the object.

According to the aspect described above, preferably, the grasp quality evaluation process is configured to obtain the grasp quality contribution degree for each contact position, using at least one of the force cones and the moment cones of the contact positions while excluding such cones of the corresponding contact position.

As the contact positions at which the fingers have not been chosen as fingers-to-be-moved, do not change during the movement of the pre-determined finger-to-be-moved, the grasp quality contribution degree thus obtained allows to estimate the grasp stability of the object if the finger at this contact position is removed, or if the contact force of the finger at this contact position decreases. By employing the grasp quality contribution degree defined as above, it is possible to specify the finger-to-be-moved more accurately, and it is extremely useful to maximally improve the grasp stability of the object.

According to the aspect described above, preferably, the grasp quality evaluation process is configured to obtain a moment cone for each of the multiple contact positions, such a moment cone including a set of moments around the gravity center of the object generated by a set of contact forces that do not cause the fingers to slip at the corresponding contact positions, and the grasp quality evaluation process is further configured to define, for each contact position, a minimum convex hull which includes all of the force cones and the moment cones of the contact positions while excluding such cones of the corresponding contact position, and obtain the grasp quality contribution degree of the corresponding contact position using at least one of the following elements: the volume of the convex hull; and the shortest distance between a boundary of the convex hull and the gravity center of the object.

As the contact positions at which the fingers have not been chosen as fingers-to-be-moved, do not change during the movement of the finger-to-be-moved, the grasp quality contribution degree thus defined using the minimum convex hull allows to estimate the grasp stability of the object if the finger at this contact position is removed, or if the contact force of the finger at this contact position decreases. By employing the grasp quality contribution degree defined as above, it is possible to specify the finger-to-be-moved more accurately, and it is extremely useful to maximally improve the grasp stability of the object.

According to the aspect described above, preferably, the device further includes a grasp manipulability evaluation process configured to obtain, for each of the fingers, a grasp manipulability evaluation value indicating either a movable range of the corresponding finger or a current position of the corresponding finger with respect to a singular posture of the corresponding finger where the corresponding finger cannot move at a required speed in certain direction, wherein the grasp quality evaluation process is configured to obtain one of the grasp quality contribution degrees and the grasp quality evaluation value using the grasp manipulability evaluation value for each of the fingers.

By introducing the grasp manipulability evaluation value, in addition to whether or not the object is stably grasped and may not easily been dropped, it is possible to evaluate quantitatively whether or not, while the finger manipulates the object to the desired position and posture, the finger is close to a singular posture with which the object cannot be manipulated, due to a restriction of the mechanical structure of each finger (that each joint has a movable range and cannot rotate limitlessly in either direction, or that a singular posture of the finger structurally exists).

For example, when the grasp manipulability evaluation value is maximized the finger joint moves back to its central position of the movement before the finger joint reaches its movement limitation, the finger is not restricted by the joint movement limit or the existence of the singular posture of the finger, and it is possible to prevent a disadvantageous situation that when the object is manipulated to the desired position and posture, the finger reaches the movement limit or the singular posture and gets stuck in this position, and the desired position and posture of the object cannot be realized, or even the motor of the joint is oscillated at this position.

According to the aspect described above, preferably, the device further includes an object detecting process configured to detect a current position and posture of the object, wherein each finger is equipped with a distributed pressure sensor, and a computer is configured to detect the relative positions of the multiple contact positions with respect to the object, based on the detected results by the distributed pressure sensor and detected results by the object detecting section.

According to this configuration, it is possible to eliminate necessity of instruction of the three-dimensional shape of the object in order to obtain the relative positions of the multiple contact positions with respect to the object, provide high adaptability in grasping of the object in various types, eliminate time required for instruction to reduced overall operating time, and provide advantageous effects in improving work efficiency and manipulability.

According to the aspect described above, preferably, each finger is equipped with a distributed pressure sensor, and a computer is configured to estimate, for each finger, a direction of a contact normal vector with the object O at the contact position, based on the detected results by the distributed pressure sensor.

According to this configuration, it is possible to eliminate necessity of instruction of the three-dimensional shape of the object in order to obtain the direction of the contact normal vector at each of the multiple contact positions, provide high adaptability in grasping of the object in various types, eliminate time required for instruction to reduced overall operating time, and provide advantageous effects in improving work efficiency and manipulability.

According to the aspect described above, the device can further contain an object shape estimation process configured to estimate a surface shape of the object at the contact positions based on the detected results by the distributed pressure sensors.

According to this configuration, it is possible to eliminate necessity of instruction of the three-dimensional shape of the object in order to estimate the surface shape of the object to be grasped, provide high adaptability in grasping of the object in various types, eliminate time required for instruction to reduced overall operating time, and provide advantageous effects in improving work efficiency and manipulability.

According to the aspect described above, preferably, the finger movement control process is configured to send, to the driving apparatus, the control command for making the determined finger-to-be-moved move on the surface of the object to keep the finger always contacting with the object based on the surface shape estimated by the object shape estimation process.

In this case, it is possible to eliminate necessity of instruction of the three-dimensional shape of the object in order to move the finger-to-be-moved on the surface of the object, provide high adaptability in grasping of the object in various types, eliminate time required for instruction to reduced overall operating time, and provide advantageous effects in improving work efficiency and manipulability.

According to the aspect described above, preferably, the finger movement control process is configured to send, to the driving apparatus, a control command for making the current position and posture of the object with respect to the gripper track a target value while considering a gravity force and an inertial force applied on the object.

In Japanese Patent No. 4890199, the contact force is adjusted to maintain the balance of the object only based on the contact forces between the gripper and the object. However, only the static balancing is considered. While it is necessary to consider dynamics of the object (acceleration and angular acceleration, speed and angular speed, position and posture of the object) and the gravity force of the object during the movement of the object, however, these elements have not been considered at all in Japanese Patent No. 4890199. Therefore, in a case of the grasping posture in which the gravity force of the object just lies in a direction in which the object may be easily dropped, or in a case in which the object is moved when there is an unexpected external force, and an inertial force of the object becomes unignorably, the object can be adversely dropped as the repositioning operation is carried out without compensating the gravity force and the inertial force of the object in Japanese Patent No. 4890199. Further, when the repositioning operation is carried out without considering dynamics of the object, it is not possible to well perform tracking control to achieve the specified desired position and posture, and the object can adversely not be manipulated to achieve the specified desired position and posture of the object.

However, the configuration described above solves the problems in Japanese Patent No. 4890199, as the dynamics and the gravity force of the object are considered, and the inertial force and the gravity force of the object are always compensated.

According to the aspect described above, preferably, the finger movement control process is configured to generate the control command for making the current position and posture of the object with respect to the gripper track a target value based on a robust control method, taking a model error of inertia of the object as an uncertain factor, and taking the estimation errors of the gravity force and the shape of the object as well as an unexpected external force applied to the object as disturbance.

There is a case in which various problems may happen which hinders the intended control while a control technique for the repositioning operation (in-hand manipulation) of the object by the gripper is actually put into practice. For example, when a box of apples with similar but slightly different weights and shapes are to be grasped using the same gripper, since the actual gravity forces, shapes, and inertia of these apples are also slightly different, and each individual apple may not be moved as intended by the control law due to individual error from the model. Further, in a case in which various types of the object are stacked and when one of the objects O is picked, if an adjacent object falls down and generate an unexpected force to the object O that we want to pick up, the object to be picked cannot adversely reach the desired position and posture due to an unexpected external force applied during movement controlling.

In the above configuration, by performing robust control to enable manipulation of the object to the desired position and posture even when such a model/estimation error or an unexpected external force exists, and thus it is possible to eliminate problems that may happen in practical implementation.

A second aspect of the present invention proposes a gripper control method for controlling a gripper that grasps an object with multiple fingers, the method including: obtaining a grasp quality contribution degree for each of the multiple contact positions at which the fingers that support the object are in contact with the object, the grasp quality contribution degree indicating contribution degree to the grasp stability of the object; and determining the contact positions at which the grasp quality contribution degree are low and decide the fingers hold at such contact positions as the fingers-to-be-moved, wherein the grasp quality contribution degree for each of the multiple contact positions is defined using at least one of the following elements: relative locations of the multiple contact positions related to the object; and friction coefficients between the object and the fingers respectively at multiple contact positions.

According to the second aspect, by introducing the grasp quality contribution degree for each of the multiple contact positions, and by determining a finger corresponding to a contact position whose grasp quality contribution degree is low as the finger-to-be-moved, a finger corresponding to a contact position whose contribution degree to the grasp stability is lower and thus can be changed is determined as the finger-to-be-moved. As the grasp quality contribution degree of the finger-to-be-moved is lower than the grasp quality contribution degrees of other fingers, even when the finger-to-be-moved is removed from the object, or when the contact force of the finger-to-be-moved supplied to the object decreases, it is less likely to drop the object due to a considerable decrease in the grasp stability of the object. Further, as an example, by moving the finger-to-be-moved, for example, to a new desired contact position at which the grasp quality contribution degree increases, it is possible to improve the grasp stability of the object.

It should be noted that in all of the above description regarding the gripper control device according to the first aspect, the operations that are performed by or can be performed by the grasp quality evaluation process, the finger-to-be-moved determination process, the finger movement control process, the grasp manipulability evaluation process, the object detection process, and the object shape estimation process may be processed or executed using a computer. In other words, all of the gripper control devices according to the first aspect described above can be defined as a method for executing processes that are performed or can be performed by these processes.

A third aspect of the present invention provides a gripper simulation device for simulating a gripper that grasps an object with multiple fingers, the device including: a controller; and a memory storing a program, based on the program, the controller is configured to conduct: a grasp quality evaluation process configured to obtain a grasp quality contribution degree for each of the multiple contact positions at which the fingers that support the object are in contact with the object, the grasp quality contribution degree indicating contribution degree to the grasp stability of the object; and a finger-to-be-moved determination process to determine the contact positions at which the grasp quality contribution degree are low and decide the fingers hold at such contact positions as the fingers-to-be-moved, wherein the grasp quality contribution degree for each of the multiple contact positions is defined using at least one of the following elements: relative locations of multiple contact positions related to the object; and friction coefficients between the object and the fingers at multiple contact positions.

According to the third aspect, by introducing the grasp quality contribution degree for each of the multiple contact positions, and by determining a finger corresponding to a contact position whose grasp quality contribution degree is low as the finger-to-be-moved, a finger corresponding to a contact position whose contribution degree to the grasp stability is lower and thus can be changed is determined as the finger-to-be-moved. As the grasp quality contribution degree of the finger-to-be-moved is lower than the grasp quality contribution degrees of other fingers, even when the finger-to-be-moved is removed from the object, or when the contact force of the finger-to-be-moved supplied to the object decreases, it is less likely to drop the object due to a considerable decrease in the grasp stability of the object. Further, as an example, by moving the contact position of the finger-to-be-moved, for example, to a new desired contact position at which the grasp quality contribution degree increases on simulation, it is possible to perform simulation on whether or not the grasp stability of the object may be improved.

It should be noted that in all of the above description regarding the gripper control device according to the first aspect, the operations that are performed by or can be performed by the grasp quality evaluation process, the finger-to-be-moved determination process, the finger movement control section, the grasp manipulability evaluation process, the object detection process, and the object shape estimation process may be processed or executed using a computer. In other words, all of the gripper control devices according to the first aspect described above can perform simulation of processes that are performed or can be performed by these processes of all of the gripper control devices according to the first aspect, assuming that a model of a gripper set in the simulation device is the gripper according to the first aspect, for example. Specifically, all of the gripper control devices according to the first aspect described above can be defined as a simulation device for executing processes that are performed or can be performed by these processes.

According to the aforementioned aspects, the gripper control device is capable of always considering the grasp stability of an object by a gripper to carry out a repositioning operation of the object while keeping the object to be grasped stably enough, in which when the grasp stability decreases, a finger with a lower contribution degree to grasp stability is determined as a finger-to-be-moved, and the finger-to-be-moved is moved to improve the grasp stability.

The invention claimed is:

1. A gripper control device for controlling a gripper that grasps an object with a plurality of fingers, the gripper control device comprising:
a controller; and
a memory storing a program, based on the program, the controller is configured to conduct:
a grasp quality evaluation process to obtain a grasp quality contribution degree for each of a plurality of contact positions at which multiple fingers that support the object are in contact with the object, the grasp quality contribution degree indicating contribution degree to the grasp stability of the object;
a finger-to-be-moved determination process to determine, as a finger-to-be-moved, at least one of the fingers corresponding to at least one of the contact positions at which the grasp quality contribution degree is low; and
a finger movement control process to send a control command to a finger driving apparatus, the control command being one for moving the determined finger-to-be-moved with respect to the object, wherein
the grasp quality contribution degree for each contact position is defined using at least one of following elements: relative locations of the plurality of contact positions related to the object; and friction coefficients between the object and the fingers respectively at the plurality of contact positions.

2. The gripper control device according to claim 1, wherein
in the grasp quality evaluation process, the controller is configured to obtain a grasp quality evaluation value indicating quantitative evaluation of the grasp stability of the object with multiple fingers corresponding to the plurality of contact positions,
in the finger-to-be-moved determination process, the controller is configured to determine, as the finger-to-be-moved, at least one of the fingers corresponding to at least one of the contact positions at which the grasp quality contribution degree is low, when the grasp quality evaluation value is lower than a pre-determined threshold value,
the controller is configured to conduct finger movement control of the finger movement control process when the grasp quality evaluation value is lower than the threshold value, and
the grasp quality evaluation value is defined using at least one of the following elements: relative locations of the plurality of contact positions related to the object; and the friction coefficients between the object and the fingers respectively at the plurality of contact positions.

3. The gripper control device according to claim 2, wherein
in the finger movement control process, the controller is configured to perform optimization problem solving processing to obtain a target value for either a driving amount or a driving speed of the driving apparatus, and the optimization problem solving processing obtains the target value for making the determined finger-to-be-moved move in a direction toward which the grasp quality evaluation value increases.

4. The gripper control device according to claim 3, wherein
the optimization problem solving processing obtains the target value for the driving speed of a motor which drives a joint of the determined finger-to-be-moved, by maximizing an objective function which is the first time derivative of the grasp quality evaluation value.

5. The gripper control device according to claim 2, wherein
one of the grasp quality evaluation value and the grasp quality contribution degree for each contact position is defined using a contact force generated at each contact position.

6. The gripper control device according to claim 2, wherein
when four contact positions exist between the fingers and the object, in the grasp quality evaluation process, the controller is configured to define, for each contact position, a point obtained by projecting the corresponding contact position on a plane which is defined by the three remaining contact positions excluding the corresponding contact position used for projecting, to obtain an area of a quadrangle as the grasp quality contribution degree of the corresponding contact position, or to obtain a minimum value of the areas of the quadrangles regarding respective contact positions as the grasp quality evaluation value, and wherein the quadrangle used for a certain contact position is defined by the other contact positions excluding the corresponding contact position used for projecting,
in the finger-to-be-moved determination process, the controller is configured to determine that the grasp quality contribution degree for a contact position is low if the area of the quadrangle for that contact position is small.

7. The gripper control device according to claim 2, wherein
in the grasp quality evaluation process, the controller is configured to obtain a force cone for each contact position, the force cone including a set of vectors of contact forces that do not cause the fingers to slip at the corresponding contact positions, and obtain the grasp quality evaluation value using the obtained force cone.

8. The gripper control device according to claim 2, wherein
in the grasp quality evaluation process, the controller is configured to obtain a moment cone for each contact position, the moment cone including a set of moments around a gravity center of the object generated by a set of contact forces that do not cause the fingers to slip at the corresponding contact positions, and obtain the grasp quality evaluation value using the obtained moment cone.

9. The gripper control device according to claim 8, wherein
in the grasp quality evaluation process, the controller is configured to obtain the grasp quality contribution degree for each contact position, using at least the moment cones of the contact position while excluding the force cones and the moment cones generated by the corresponding contact position.

10. The gripper control device according to claim 2, further comprising:
the controller is configured to conduct, based on the program, a grasp manipulability evaluation process to obtain, for each finger, a grasp manipulability evaluation value indicating either a movable range of the corresponding finger or a current position of the corresponding finger with respect to a singular posture of the corresponding finger where the corresponding finger cannot move in a required speed in a desired direction, wherein
in the grasp quality evaluation process, the controller is configured to obtain one of the grasp quality contribution degrees and the grasp quality evaluation values using the grasp manipulability evaluation values for the respective fingers.

11. The gripper control device according to claim 1, wherein
in the finger movement control process, the controller sends, to the driving apparatus, the control command which makes the determined finger-to-be-moved move on the surface of the object while always keeping the finger contacting with the object without separating.

12. The gripper control device according to claim 1, wherein
in the grasp quality evaluation process, the controller is configured to obtain a force cone, which is also named as friction cone, for each contact position, the force cone including a set of vectors of contact forces that do not cause the fingers to slip at the corresponding contact positions, and obtain the grasp quality contribution degree for each contact position using the obtained force cone.

13. The gripper control device according to claim 12, wherein
in the grasp quality evaluation process, the controller is configured to obtain the grasp quality contribution degree for each contact position, using at least the force cones of the contact positions while excluding the force cones and the moment cones generated by the corresponding contact position.

14. The gripper control device according to claim 12, wherein
in the grasp quality evaluation process, the controller is configured to obtain a moment cone for each contact position, the moment cone including a set of moments around a gravity center of the object generated by a set of contact forces that do not cause the fingers to slip at the corresponding contact positions, and
in the grasp quality evaluation process, the controller is further configured to define, for each contact position, a minimum convex hull which contains all of the force cones and the moment cones of the contact positions while excluding the force cones and the moment cones generated by the corresponding contact position, and obtain the grasp quality contribution degree of the corresponding contact position using at least one of the following elements: a volume of the convex hull; and the shortest distance between a boundary of the convex hull and the gravity center of the object.

15. The gripper control device according to claim 12 wherein
in the grasp quality evaluation process, the controller is configured to obtain a moment cone for each contact position, the moment cone including a set of moments around a gravity center of the object generated by a set of contact forces that do not cause the fingers to slip at the corresponding contact positions, and obtain the grasp quality contribution degree for each contact position using the obtained moment cone.

16. The gripper control device according to claim 1 wherein
in the grasp quality evaluation process, the controller is configured to obtain a moment cone for each contact position, the moment cone including a set of moments around a gravity center of the object generated by a set of contact forces that do not cause the fingers to slip at the corresponding contact positions, and obtain the grasp quality contribution degree for each contact position using the obtained moment cone.

17. The gripper control device according to claim 16, wherein
in the grasp quality evaluation process, the controller is configured to obtain the grasp quality contribution degree for each contact position, using at least the moment cones of the contact positions while excluding the force cones and the moment cones generated by the corresponding contact position.

18. The gripper control device according to claim 1, further comprising:
an object detecting device configured to detect a current position and posture of the object, wherein
each finger is equipped with a distributed pressure sensor, and
a computer is configured to detect the relative locations of the plurality of contact positions with respect to the object, based on detected results by the distributed pressure detecting device and the detected results by the object detecting device.

19. The gripper control device according to claim 18, further comprising:
the controller is configured to conduct, based on the program, an object shape estimation process to estimate a surface shape of the object at the contact positions based on the detected results by the distributed pressure sensors.

20. The gripper control device according to claim 19, wherein
in the finger movement control process, the controller is configured to send, to the driving apparatus, the control command for making the determined finger-to-be-moved move on the surface of the object to keep the finger always contacting with the object based on the surface shape estimated by the object shape estimation process.

21. The gripper control device according to claim 1, wherein
each finger is equipped with a distributed pressure sensor, and
a computer is configured to estimate, for each finger, a direction of a contact normal vector at the contact position related to the object O, based on the detected results by the distributed pressure sensor.

22. The gripper control device according to claim 1 wherein
in the finger movement control process, the controller is configured to send, to the driving apparatus, a control command for tracking a desired position and posture of the object with respect to the gripper while considering a gravity force and an inertial force applied on the object.

23. The gripper control device according to claim 1 wherein
in the finger movement control process, the controller is configured to generate the control command for tracking a desired position and posture of the object with respect to the gripper based on a robust control method, by considering a model error of inertia of the object as an uncertain factor, and considering estimation errors on a gravity force and an object shape as well as an unexpected external force applied to the object as disturbance.

24. A gripper control method for controlling a gripper control device that includes a gripper that grasps an object with a plurality of fingers, wherein the gripper control device comprises a controller and a memory storing a program that, based on the program, is configured to conduct a grasp quality evaluation process to obtain a grasp quality contribution degree for each of a plurality of contact positions at which multiple fingers that support the object are in contact with the object, the grasp quality contribution degree indicating contribution degree to the grasp stability of the object, a finger-to-be-moved determination process to determine, as a finger-to-be-moved, at least one of the fingers corresponding to at least one of the contact positions at which the grasp quality contribution degree is low, and a finger movement control process to send a control command to a finger driving apparatus, the control command being one for moving the determined finger-to-be-moved with respect to the object, the method comprising:

obtaining the grasp quality contribution degree;

determining the finger-to-be-moved; and sending the control command to the finger driving apparatus to move the determined finger-to-be-moved with respect to the object, wherein the grasp quality contribution degree for each contact position is defined by using at least one of the following elements: relative locations of the plurality of contact positions related to the object and friction coefficients between the object and the fingers respectively at the plurality of contact positions.

25. A gripper simulation device for simulating a gripper that grasps an object with a plurality of fingers, the gripper simulation device comprising:

a controller; and a memory storing a program, based on the program, the controller is configured to conduct:

a grasp quality evaluation process configured to obtain a grasp quality contribution degree for each of a plurality of contact positions at which multiple fingers that support the object are in contact with the object, the grasp quality contribution degree indicating contribution degree to grasp stability of the object; and a finger-to-be-moved determination process to determine, as a finger-to-be-moved to be moved with respect to the object, at least one of the fingers corresponding to at least one of the contact positions at which the grasp quality contribution degree is low, wherein the grasp quality contribution degree for each of the plurality of contact positions is defined using at least one of the following elements: relative locations of the plurality of contact positions related to the object; and friction coefficients between the object and the fingers respectively at the plurality of contact positions.

* * * * *